US009039804B2

(12) United States Patent
Whitcomb et al.

(10) Patent No.: US 9,039,804 B2
(45) Date of Patent: May 26, 2015

(54) NANOWIRE PREPARATION METHODS, COMPOSITIONS, AND ARTICLES

(75) Inventors: David R. Whitcomb, Woodbury, MN (US); William D. Ramsden, Afton, MN (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 13/289,513

(22) Filed: Nov. 4, 2011

(65) Prior Publication Data
US 2012/0148442 A1 Jun. 14, 2012

Related U.S. Application Data

(60) Provisional application No. 61/421,296, filed on Dec. 9, 2010, provisional application No. 61/432,218, filed on Jan. 13, 2011, provisional application No. 61/488,813, filed on May 23, 2011, provisional
(Continued)

(51) Int. Cl.
| | |
|---|---|
| B22F 9/24 | (2006.01) |
| B82B 3/00 | (2006.01) |
| C22C 5/06 | (2006.01) |
| B22F 1/00 | (2006.01) |
| B82Y 30/00 | (2011.01) |
| C22C 1/04 | (2006.01) |
| C22C 28/00 | (2006.01) |

(52) U.S. Cl.
CPC .............. B22F 9/24 (2013.01); B22F 1/0025 (2013.01); B22F 2998/00 (2013.01); B82Y 30/00 (2013.01); C22C 1/0466 (2013.01); C22C 5/06 (2013.01); C22C 28/00 (2013.01)

(58) Field of Classification Search
CPC ............ B01D 53/9418; B01D 53/8625; F01N 3/2066; F01N 3/0842; F01N 2570/14; F23J 2215/101
USPC ........................................................... 75/371
See application file for complete search history.

(56) References Cited

U.S. PATENT DOCUMENTS

| 5,380,692 A * | 1/1995 | Nakatsuji et al. .............. 502/303 |
| 5,728,643 A * | 3/1998 | Naitoh et al. .................. 502/302 |
| 6,645,444 B2 | 11/2003 | Goldstein |
| 7,922,787 B2 * | 4/2011 | Wang et al. ...................... 75/371 |
| 2004/0188325 A1 | 9/2004 | Stivers |

(Continued)

FOREIGN PATENT DOCUMENTS

| CN | 101157140 A | 4/2008 |
| CN | 101244459 A | 8/2008 |

(Continued)

OTHER PUBLICATIONS

Standard Reduction Potentials, Process Principles in Minerals and Materials Production 3rd ed. Edited by P. C. Hayes Brisbane, Queensland, Australia: Hayes Publishing co, 2003.*

(Continued)

*Primary Examiner* — Jie Yang
*Assistant Examiner* — Xiaowei Su
(74) *Attorney, Agent, or Firm* — Reed L. Christiansen

(57) ABSTRACT

Nanomaterial preparation methods, compositions, and articles are disclosed and claimed. Such methods can provide nanomaterials with improved morphologies and reduced nitric oxide co-production relative to previous methods. Such materials are useful in electronic applications.

8 Claims, 38 Drawing Sheets

Related U.S. Application Data application No. 61/494,072, filed on Jun. 7, 2011, provisional application No. 61/521,776, filed on Aug. 10, 2011, provisional application No. 61/521,859, filed on Aug. 10, 2011, provisional application No. 61/521,867, filed on Aug. 10, 2011, provisional application No. 61/522,258, filed on Aug. 11, 2011, provisional application No. 61/522,738, filed on Aug. 12, 2011, provisional application No. 61/522,749, filed on Aug. 12, 2011, provisional application No. 61/522,757, filed on Aug. 12, 2011, provisional application No. 61/522,766, filed on Aug. 12, 2011, provisional application No. 61/523,419, filed on Aug. 15, 2011, provisional application No. 61/523,882, filed on Aug. 16, 2011, provisional application No. 61/523,893, filed on Aug. 16, 2011.

(56) References Cited

U.S. PATENT DOCUMENTS

| 2009/0320457 A1* | 12/2009 | Wan | 60/299 |
|---|---|---|---|
| 2012/0148436 A1 | 6/2012 | Whitcomb et al. | |

FOREIGN PATENT DOCUMENTS

| CN | 101934377 | 1/2011 |
|---|---|---|
| CN | 102029400 | 4/2011 |
| EP | 1 918 046 B1 | 4/2012 |
| JP | 2008-190006 | 8/2008 |
| JP | 2009-155674 | 7/2009 |

OTHER PUBLICATIONS

Younan Xia, et al., "Shape-Controlled Synthesis of Metal Nanocrystals: Simple Chemistry Meets Complex Physics?", Angew. Chem. Int. Ed. 2009, 48, pp. 60-103.

Jinting Jiu, et al., "Preparation of Ag nanorods with high yield by polyol process," Mat. Chem. & Phys., 2009, 114, pp. 333-338.

Srichandana Nandikonda, "Microwave Assisted Synthesis of Silver Nanorods," M.S. Thesis, Auburn University, Aug. 9, 2010, 59 pages.

Srichandana Nandikonda, et al., "Effects of salt selection on the rapid synthesis of silver nanowires," Abstract INOR-200, $240^{th}$ ACS National Meeting, Boston, MA, Aug. 23, 2010, 1 page.

Y.C. Lu, et al., "Tailoring of silver wires and their performance as transparent conductive coatings," Nanotechnology, 2010, 21, 215707, 6 pages.

Qiang Zhang, et al., "Production of Ag Nanocubes on Scale of 0.1 g per Batch by Protecting the NaHS-Mediated Polyol Synthesis with Argon," Applied Materials & Interfaces, 2009, 1, pp. 2044-2048.

Raymond W. Nims, et al., "Colormetric Assays for Nitric Oxide and Nitrogen Oxide Species Formed From Nitric Oxide Stock Solutions and Donor Compounds," Methods in Enzymology, 1996, 268, pp. 93-105.

Commonly assigned U.S. Appl. No. 13/205,080, entitled: Nanowire Preparation Methods, Compositions and, Articles filed on Aug. 8, 2011, by Ramsden et al.

International Search Report, International Application No. PCT/US2011/059493, dated Dec. 5, 2012, 2 pages.

Sun et al., Crystalline Silver Nanowires by Soft Solution Processing, American Chemical Society, Nano Letters, vol. 2, No. 2, pp. 165-168, 2002.

http://en.wikipedia.org/wik/Thorium, 21 pages, printed from WW web on Jan. 8, 2013.

Tang et al., Synthesis of Silver Nanowires in Liquid Phase, Nanowires Science and Technology, Feb. 2010, pp. 25-43.

Davis, Preparation and Adsorptive Properties of Thorium Oxide, University of Florida, Jun. 1965.

Y. Sun et al., Uniform Silver Nanowires Synthesis by Reducing $AgNO_3$ with Ethylene Glycol in the Presence of Seeds and Poly (Vinyl Pyrrolidone), Chem. Mater., 2002, vol. 14, pp. 4736-4745.

Standard electrode potential, Sep. 15, 2014, 16 pages, WW web address: http://en.wikipedia.org/wiki/Standard electrode potential (data page).

* cited by examiner

NANOWIRE PREPARATION METHODS, COMPOSITIONS, AND ARTICLES

CROSS REFERENCE TO RELATED APPLICATIONS

This application claims the benefit of U.S. Provisional Application No. 61/421,296, filed Dec. 9, 2010, entitled LANTHANIDE CATALYSIS OF METAL ION REDUCTION, METHODS, COMPOSITIONS, AND ARTICLES; U.S. Provisional Application No. 61/432,218, filed Jan. 13, 2011, entitled PREPARATION OF AgNW IN THE PRESENCE OF NITRIC OXIDE; U.S. Provisional Application No. 61/488,813, filed May 23, 2011, entitled METAL ION REDUCTION WITH LOW NITRIC OXIDE COPRODUCTION, METHODS, COMPOSITIONS, AND ARTICLES; U.S. Provisional Application No. 61/494,072, filed Jun. 7, 2011, entitled NANOWIRE PREPARATION METHODS, COMPOSITIONS, AND ARTICLES; U.S. Provisional Application No. 61/521,776, filed Aug. 10, 2011, entitled NANOWIRE PREPARATION METHODS, COMPOSITIONS, AND ARTICLES; U.S. Provisional Application No. 61/521,859, filed Aug. 10, 2011, entitled NANOWIRE PREPARATION METHODS, COMPOSITIONS, AND ARTICLES; U.S. Provisional Application No. 61/521,867, filed Aug. 10, 2011, entitled NANOWIRE PREPARATION METHODS, COMPOSITIONS, AND ARTICLES; U.S. Provisional Application No. 61/522,258, filed Aug. 11, 2011, entitled NANOWIRE PREPARATION METHODS, COMPOSITIONS, AND ARTICLES; U.S. Provisional Application No. 61/522,738, filed Aug. 12, 2011, entitled NANOWIRE PREPARATION METHODS, COMPOSITIONS, AND ARTICLES; U.S. Provisional Application No. 61/522,749, filed Aug. 12, 2011, entitled NANOWIRE PREPARATION METHODS, COMPOSITIONS, AND ARTICLES; U.S. Provisional Application No. 61/522,757, filed Aug. 12, 2011, entitled NANOWIRE PREPARATION METHODS, COMPOSITIONS, AND ARTICLES; U.S. Provisional Application No. 61/522,766, filed Aug. 12, 2011, entitled NANOWIRE PREPARATION METHODS, COMPOSITIONS, AND ARTICLES; U.S. Provisional Application No. 61/523,419, filed Aug. 15, 2011, entitled NANOWIRE PREPARATION METHODS, COMPOSITIONS, AND ARTICLES; U.S. Provisional Application No. 61/523,882, filed Aug. 16, 2011, entitled NANOWIRE PREPARATION METHODS, COMPOSITIONS, AND ARTICLES; and U.S. Provisional Application No. 61/523,893, filed Aug. 16, 2011, entitled NANOWIRE PREPARATION METHODS, COMPOSITIONS, AND ARTICLES, each of which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having desired lengths and widths, however, is not known. For example, the $Fe^{2+}$ produces a wide variety of lengths or thicknesses and the $Cu^{2+}$ produces wires that are too thick for many applications. Moreover, silver ions are commonly provided as silver nitrate, which can lead to nitric oxide (NO) co-production during silver nanowire preparation by this method. Because nitric oxide emissions to the air are regulated in some jurisdictions, it is desirable to develop methods that reduce its co-production.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M.S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Mass., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, *Nanotech.*, 2010, 21, 215707, which discloses $Pd^{2+}$; and Chinese patent application publication CN102029400, which discloses NaCl, $MnCl_2$, and $Na_2S$.

Japanese patent publication 2008-190006 discloses co-production of nitric oxide during silver nanowire synthesis. However, the publication also discloses use of vacuum to increase the amount of nitric oxide released to the vapor phase from the reaction medium.

Q. Zhang, C. Cobley, L. Au, M. McKiernan, A. Schwartz, L.-P. Wen, J. Chen, Y. Xia, *Applied Materials & Interfaces*, 2009, 1, 2044, describes co-production of nitrogen dioxide ($NO_2$) during silver nanowire synthesis.

SUMMARY

At least some embodiments provide methods comprising providing at least one composition comprising at least one first reducible metal ion and at least one second metal or metal ion comprising at least one lanthanide metal or ion of a lanthanide, the at least one second metal or metal ion differing in atomic number from the at least one first reducible metal ion; and reducing the at least one first reducible metal ion to at least one first metal.

In some such methods, the at least one first reducible metal ion comprises one or more of at least one coinage metal ion, at least one ion of an element from IUPAC Group 11, or at least one silver ion.

In some cases, the at least one lanthanide metal or ion of a lanthanide comprises one or more of lanthanum, an ion of lanthanum, cerium, an ion of cerium, praseodymium, an ion of praseodymium, neodymium, an ion of neodymium, samarium, an ion of samarium, europium, an ion of europium, gadolinium, an ion of gadolinium, terbium, an ion of terbium, dysprosium, an ion of dysprosium, holmium, an ion of holmium, erbium, an ion of erbium, thulium, an ion of thulium, ytterbium, an ion of ytterbium, lutetium, or an ion of lutetium.

In some embodiments, the methods further comprise co-producing nitric oxide at a ratio A of moles nitric oxide co-produced per mole of the at least one first reducible metal ion reduced. The ratio A may, for example, be less than 15% of the maximum instantaneous ratio of moles nitric oxide co-produced per mole of the at least one first reducible metal ion reduced when reducing the at least one first metal ion in the presence of $Cu^{2+}$ ions. Or the ratio A may, for example be less than 40% of the maximum instantaneous ratio of moles nitric oxide co-produced per mole of the at least one first reducible metal ion reduced when reducing the at least one first metal ion in the presence of $Fe^{2+}$ ions. Or the ratio A may, for example be less than 10% of the maximum instantaneous ratio of moles nitric oxide co-produced per mole of the at least one first reducible metal ion reduced when reducing the at least one first metal ion in the presence of $Sn^{2+}$ ions. Or the ratio A may, for example be less than 10% of the maximum instantaneous ratio of moles nitric oxide co-produced per mole of the at least one first reducible metal ion reduced when reducing the at least one first metal ion in the presence of $Mn^{2+}$ ions. Or the ratio A may, for example be less than 15% of the maximum instantaneous ratio of moles nitric oxide co-produced per mole of the at least one first reducible metal ion reduced when reducing the at least one first metal ion in the presence of $Cr^{3+}$ ions.

Other embodiments provide the at least one first metal produced according to such methods, at least one metal nanowire comprising the at least one first metal produced according to such methods. Such metal nanowires may, in some cases, comprise an average diameter between about 10 nm and about 500 nm and an aspect ratio between about 50 and about 10,000. Such metal nanowires may, for example, comprise at least one silver nanowire.

Still other embodiments provide articles comprising the at least one first metal produced according to such methods. Such articles may, for example, comprise at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

Yet other embodiments provide methods comprising reducing at least one first reducible metal ion in a first reaction medium having at least one first reaction temperature, starting the reduction at a first time; and determining an elapsed time from the first time, where the elapsed time corresponds to a maximum in nitric oxide concentration in a headspace contacting the first reaction medium. Such a reduction may, for example, occur in the presence of at least one second metal or metal ion differing in atomic number from the at least one first reducible metal ion.

Such methods may, in some cases, further comprise adjusting a recipe based on a difference between a target elapsed time and the elapsed time to provide an adjusted recipe; providing a second reaction medium from the adjusted medium; and reducing the at least one first metal ion to at least one first metal in the second reaction medium. Such a reduction may, for example, occur in the presence of at least one second metal or metal ion differing in atomic number from the at least one first reducible metal ion. Some embodiments provide the at least one first metal produced according to such methods.

Such methods may, in some cases, further comprise calculating at least one second reaction temperature based on a difference between a target elapsed time and the elapsed time; and reducing the at least one first metal ion to at least one first metal at the at least one second reaction temperature. Such a reduction may, for example, occur in the presence of at least one second metal or metal ion differing in atomic number from the at least one first reducible metal ion. Some embodiments provide the at least one first metal produced according such methods.

These embodiments and other variations and modifications may be better understood from the brief description of figures, description, exemplary embodiments, examples, figures, and claims that follow. Any embodiments provided are given only by way of illustrative example. Other desirable objectives and advantages inherently achieved may occur or become apparent to those skilled in the art. The invention is defined by the appended claims.

DESCRIPTION

Figure 1:
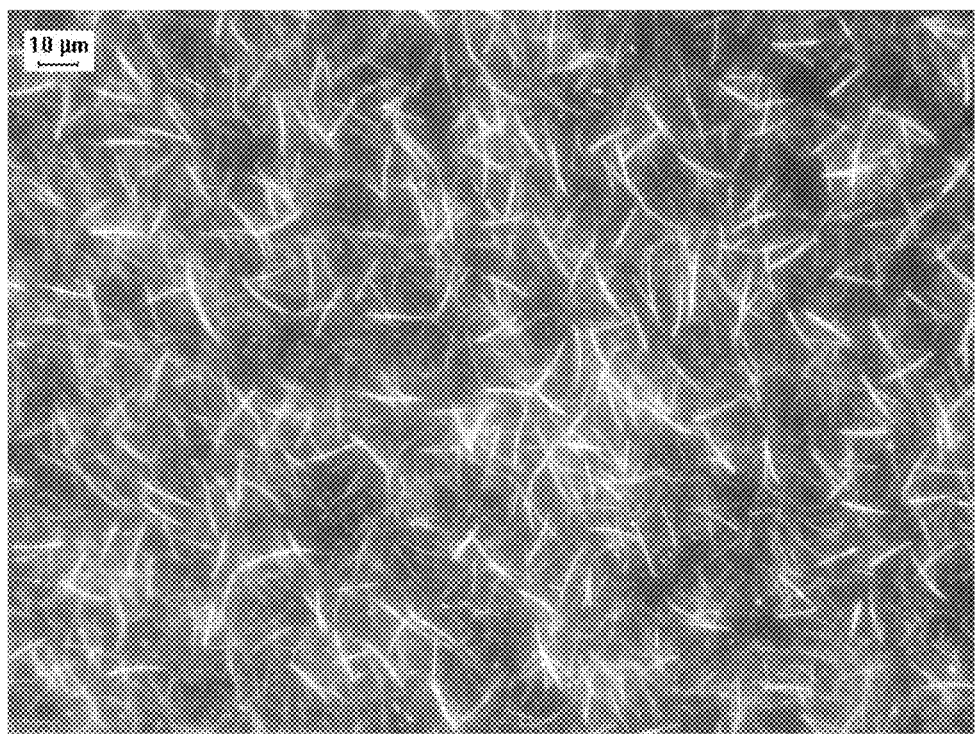
FIG. 1 shows an optical micrograph if the silver nanowire product of Example 1.

All publications, patents, and patent documents referred to in this document are incorporated by reference herein in their entirety, as though individually incorporated by reference.

U.S. Provisional Application No. 61/421,296, filed Dec. 9, 2010, entitled LANTHANIDE CATALYSIS OF METAL ION REDUCTION, METHODS, COMPOSITIONS, AND ARTICLES; U.S. Provisional Application No. 61/432,218, filed Jan. 13, 2011, entitled PREPARATION OF AgNW IN THE PRESENCE OF NITRIC OXIDE; U.S. Provisional Application No. 61/488,813, filed May 23, 2011, entitled METAL ION REDUCTION WITH LOW NITRIC OXIDE COPRODUCTION, METHODS, COMPOSITIONS, AND ARTICLES; U.S. Provisional Application No. 61/494,072, filed Jun. 7, 2011, entitled NANOWIRE PREPARATION METHODS, COMPOSITIONS, AND ARTICLES; U.S. Provisional Application No. 61/521,776, filed Aug. 10, 2011, entitled NANOWIRE PREPARATION METHODS, COMPOSITIONS, AND ARTICLES; U.S. Provisional Application No. 61/521,859, filed Aug. 10, 2011, entitled NANOWIRE PREPARATION METHODS, COMPOSITIONS, AND ARTICLES; U.S. Provisional Application No. 61/521,867, filed Aug. 10, 2011, entitled NANOWIRE PREPARATION METHODS, COMPOSITIONS, AND ARTICLES; U.S. Provisional Application No. 61/522,258, filed Aug. 11, 2011, entitled NANOWIRE PREPARATION METHODS, COMPOSITIONS, AND ARTICLES; U.S. Provisional Application No. 61/522,738, filed Aug. 12, 2011, entitled NANOWIRE PREPARATION METHODS, COMPOSITIONS, AND ARTICLES; U.S. Provisional Application No. 61/522,749, filed Aug. 12, 2011, entitled NANOWIRE PREPARATION METHODS, COMPOSITIONS, AND ARTICLES; U.S. Provisional Application No. 61/522,757, filed Aug. 12, 2011, entitled NANOWIRE PREPARATION METHODS, COMPOSITIONS, AND ARTICLES; U.S. Provisional Application No. 61/522,766, filed Aug. 12, 2011, entitled NANOWIRE PREPARATION METHODS, COMPOSITIONS, AND ARTICLES; U.S. Provisional Application No. 61/523,419, filed Aug. 15, 2011, entitled NANOWIRE PREPARATION METHODS, COMPOSITIONS, AND ARTICLES; U.S. Provisional Application No. 61/523,882, filed Aug. 16, 2011, entitled NANOWIRE PREPARATION METHODS, COMPOSITIONS, AND ARTICLES; and U.S. Provisional Application No. 61/523,893, filed Aug. 16, 2011, entitled NANOWIRE PREPARATION METHODS, COMPOSITIONS, AND ARTICLES, are all hereby incorporated by reference in their entirety.

Nitric Oxide (NO) Co-Production

Nitric oxide may be co-produced during preparation of silver nanowires from silver nitrate using the polyol reduction method. Such nitric oxide may be detected chemically, for example, using the Griess reagent. See, for example, R. W. Nims, J. C. Cook, et. al, *Methods in Enzymology*, 1996, 268, 93, which is hereby incorporated by reference in its entirety. Alternatively, such nitric oxide may be detected electronically, for example, by sampling the headspace of a reaction vessel using a photoionization detector.

Controlling NO Co-Production and Morphology with Lanthanides

Applicants have discovered that the amount of nitric oxide co-produced may be dramatically reduced through use of lanthanide ions in the reduction of silver ions to silver nanowires in the "polyol" process. Moreover, applicants have discovered that the use of lanthanide ions during nanowire preparation can allow desirable control of nanowire thickness, or length, or both, often with improved control of non-nanowire contamination.

Morphology Control Via Controlled NO Co-Production

Applications have also discovered that the time at which nitric oxide is generated is an indication of the selectivity of generation of nanowires versus generation of nanoparticles. Early evolution of NO is associated with formation of non-wire morphologies, such as nanoparticles, while late evolution is associated with formation of well-controlled nanowires. Control of NO evolution over the course of the reaction can therefore be used to control overall nanowire morphology, such as average wire length, diameter, and distribution, as well as purity and yields. Such methods may be used for nanowire preparation using either lanthanide or non-lanthanide metals or metal ions, such as, for example, $Fe^{2+}$ or $Sn^{2+}$ ions.

Applicability to Non-Silver Systems

These methods are also believed to be applicable to reducible metal cations other than silver cations, including, for example reducible cations of other IUPAC Group 11 elements, reducible cations of other coinage metals, and the like. These methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, Nanowires, and Articles

In some embodiments, the metal product formed by such methods is a nanostructure, such as, for example, a one-dimensional nanostructure. Nanostructures are structures having at least one "nanoscale" dimension less than 300 nm. Examples of such nanostructures are nanorods, nanowires, nanotubes, nanopyramids, nanoprisms, nanoplates, and the like. "One-dimensional" nanostructures have one dimension that is much larger than the other two nanoscale dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 120° C. to about 190° C., or from about 80° C. to about 190° C.

Lanthanide Ions

In some embodiments, the reduction of the reducible metal ion occurs in the presence of at least one second metal ion comprising at least one lanthanide element. Such a reduction may, for example, occur in the presence of at least one lanthanide element in its +2, +3, or +4 oxidation state. Exemplary second metal ions are $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$. Such an ion may, for example, be provided by such compounds as lanthanum (III) chloride heptahydrate, cerium (III) chloride heptahydrate, praseodymium (III) chloride heptahydrate, neodymium (III) chloride hexahydrate, samarium (III) chloride hexahydrate, europium (III) chloride hexahydrate, gadolinium (III) chloride hexahydrate, terbium (III) nitrate hexahydrate, dysprosium (III) nitrate hexahydrate, holmium (III) nitrate pentahydrate, erbium (III) chloride hexahydrate, thulium (III) chloride hexahydrate, ytterbium (III) chloride hexahydrate, lutetium (III) chloride hexahydrate.

EXEMPLARY EMBODIMENTS

U.S. Provisional Application No. 61/421,296, filed Dec. 9, 2010, entitled LANTHANIDE CATALYSIS OF METAL ION REDUCTION, METHODS, COMPOSITIONS, AND ARTICLES, which is hereby incorporated by reference in its entirety, disclosed the following 28 exemplary non-limiting embodiments:

A. A method comprising:
providing a composition comprising:
at least one first compound comprising at least one first reducible metal ion,
at least one second compound comprising at least one second metal or metal ion comprising at least one of a lanthanide metal, an ion of a lanthanide, an actinide metal, or an ion of an actinide, said at least one second metal or metal ion differing in atomic number from said at least one first reducible metal ion, and at least one solvent; and
reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inerting the at least one protecting agent.

F. The method of embodiment A, wherein the at least one first reducible metal ion comprises at least one coinage metal ion.

G. The method of embodiment A, wherein the at least one first reducible metal ion comprises at least one ion of an element from IUPAC Group 11.

H. The method of embodiment A, wherein the at least one first reducible metal ion comprises at least one ion of silver.

J. The method of embodiment A, wherein the at least one first compound comprises silver nitrate.

K. The method of embodiment A, wherein the at least one second metal or metal ion comprises at least one of a lanthanide metal or an ion of a lanthanide.

L. The method of embodiment A, wherein the at least one second metal or metal ion comprises at least one of cerium metal, an ion of cerium, samarium metal or an ion of samarium.

M. The method of embodiment A, wherein the at least one second compound comprises at least one salt of said at least one second metal or metal ion.

N. The method of embodiment M, wherein the at least one salt comprises at least one chloride.

P. The method of embodiment A, wherein the at least one solvent comprises at least one polyol.

Q. The method of embodiment A, wherein the at least one solvent comprises at least one of: ethylene glycol, propylene glycol, glycerol, one or more sugars, or one or more carbohydrates.

R. The method of embodiment A, wherein the composition has a ratio of the total moles of the at least one second metal or metal to the moles of the at least one first reducible metal ion from about 0.0001 to about 0.1.

S. The method of embodiment A, wherein the reduction is carried out at one or more temperatures from about 120° C. to about 190° C.

T. The method of embodiment A, further comprising inerting one or more of: the composition, the at least one compound comprising at least one first reducible metal ion, the at least one second metal or metal ion, or the at least one solvent.

U. The at least one first metal produced according to the method of embodiment A.

V. At least one article comprising the at least one first metal produced according to the method of embodiment A.

W. The at least one article of embodiment V, wherein the at least one first metal comprises one or more nanowires, nanocubes, nanorods, nanopyramids, or nanotubes.

X. The at least one article of embodiment V, wherein the at least one first metal comprises at least one object having an average diameter of between about 10 nm and about 500 nm.

Y. The at least one article of embodiment V, wherein the at least one first metal comprises at least one object having an aspect ratio from about 50 to about 10,000.

Z. At least one metal nanowire with an average diameter of between about 10 nm and about 150 nm, and with an aspect ratio from about 50 to about 10,000.

AA. The nanowire of embodiment Z, wherein the at least one metal comprises at least one coinage metal.

AB. The nanowire of embodiment Z, wherein the at least one metal comprises at least one element of IUPAC Group 11.

AC. The nanowire of embodiment Z, wherein the at least one metal comprises silver.

AD. At least one article comprising the at least one metal nanowire of embodiment Z.

U.S. Provisional Application No. 61/432,218, filed Jan. 13, 2011, entitled PREPARATION OF AgNW IN THE PRESENCE OF NITRIC OXIDE, which is hereby incorporated by reference in its entirety, disclosed the following 14 exemplary non-limiting embodiments:

AE. A method comprising:
reducing at least one metal ion to at least one metal in a first reaction medium having at least one first reaction temperature, starting the reduction at a first time; and
determining an elapsed time from the first time, said elapsed time corresponding to a maximum in a nitric oxide concentration in a headspace contacting the first reaction medium.

AF. The method according to embodiment AE, wherein the at least one metal ion comprises at least one element from IUPAC Group 11.

AG. The method according to embodiment AE, wherein the at least one metal ion comprises at least one coinage metal ion.

AH. The method according to embodiment AE, wherein the at least one metal ion comprises at least one silver ion.

AJ. The method according to embodiment AE, further comprising:
adjusting a recipe based on a difference between a target elapsed time and the elapsed time to provide an adjusted recipe;
providing a second reaction medium from the adjusted recipe; and
reducing the at least one metal ion in the second reaction medium.

AK. The method according to embodiment AJ, wherein the adjusting a recipe comprises at least one of updating at least one catalyst feed concentration, updating at least one catalyst feed rate, updating at least one metal ion feed concentration, updating at least one metal ion feed rate, updating at least one catalyst-to-metal ion feed concentration ratio, updating at least one catalyst-to-metal ion feed rate ratio, updating a nitric acid feed pressure, updating a nitric acid feed composition, updating a nitric acid feed rate, updating a nitric acid-to-metal ion feed concentration ratio, updating a nitric acid-to-metal ion feed rate ratio, updating a nitric acid-to-catalyst feed concentration ratio, updating a nitric acid-to-catalyst feed rate ratio, updating a nitric acid feed starting time, or updating a nitric acid feed duration.

AL. The method according to embodiment AJ, wherein the providing the second reaction medium comprises adding at least one component to the first reaction medium.

AM. The method according to embodiment AL, wherein the at least one component comprises at least one of the first metal ion, a catalyst, a protecting agent, a solvent, or nitric oxide.

AN. The method according to embodiment AE, further comprising:
calculating at least one second reaction temperature based on a difference between a target elapsed time and the elapsed time; and
reducing the at least one metal ion at the at least one second reaction temperature.

AP. The method according to embodiment AE, further comprising:
adding nitric oxide to the first reaction medium.

AQ. The at least one first metal produced according to the method of embodiment AE.

AR. At least one nanowire comprising the at least one first metal according to embodiment AQ.

AS. At least one article comprising the at least one first metal according to embodiment AQ.

AT. The at least one article according to embodiment AS, comprising at least one electronic device.

U.S. Provisional Application No. 61/488,813, filed May 23, 2011, entitled METAL ION REDUCTION WITH LOW NITRIC OXIDE COPRODUCTION, METHODS, COMPOSITIONS, AND ARTICLES, which is hereby incorporated by reference in its entirety, disclosed the following 31 exemplary non-limiting embodiments:

AU. A method of producing at least one first metal with reduced nitric oxide co-production, comprising:
providing a composition comprising:
at least one first compound comprising at least one first reducible metal ion,
at least one second compound comprising at least one second metal or metal ion comprising at least one of a lanthanide metal, an ion of a lanthanide, an actinide metal, or an ion of an actinide, said at least one second metal or metal ion differing in atomic number from said at least one first reducible metal ion, and
at least one solvent; and
reducing the at least one first reducible metal ion to at least one first metal.

AV. The method of embodiment AU, wherein the composition further comprises at least one protecting agent.

AW. The method of embodiment AV, wherein the at least one protecting agent comprises at least one of: one or more surfactants, one or more acids, or one or more polar polymers.

AX. The method of embodiment AV, wherein the at least one protecting agent comprises polyvinylpyrrolidinone.

AY. The method of embodiment AV, further comprising inerting the at least one protecting agent.

AZ. The method of embodiment AU, wherein the at least one first reducible metal ion comprises at least one coinage metal ion.

BA. The method of embodiment AU, wherein the at least one first reducible metal ion comprises at least one ion of an element from IUPAC Group 11.

BB. The method of embodiment AU, wherein the at least one first reducible metal ion comprises at least one ion of silver.

BC. The method of embodiment AU, wherein the at least one first compound comprises silver nitrate.

BD. The method of embodiment AU, wherein the at least one second metal or metal ion comprises at least one of a lanthanide metal or an ion of a lanthanide.

BE. The method of embodiment AU, wherein the at least one second metal or metal ion comprises at least one of cerium metal, an ion of cerium, samarium metal or an ion of samarium.

BF. The method of embodiment AU, wherein the at least one second compound comprises at least one salt of said at least one second metal or metal ion.

BG. The method of embodiment BF, wherein the at least one salt comprises at least one chloride.

BH. The method of embodiment AU, wherein the at least one solvent comprises at least one polyol.

BJ. The method of embodiment AU, wherein the at least one solvent comprises at least one of: ethylene glycol, propylene glycol, glycerol, one or more sugars, or one or more carbohydrates.

BK. The method of embodiment AU, wherein the composition has a ratio of the total moles of the at least one second metal or metal to the moles of the at least one first reducible metal ion from about 0.0001 to about 0.1.

BL. The method of embodiment AU, wherein the metal ion reduction is carried out at one or more temperatures from about 120° C. to about 190° C.

BM. The method of embodiment AU, further comprising inerting one or more of: the composition, the at least one compound comprising at least one first reducible metal ion, the at least one second metal or metal ion, or the at least one solvent.

BN. The at least one first metal produced according to the method of embodiment AU.

BP. At least one article comprising the at least one first metal produced according to the method of embodiment AU.

BQ. The at least one article of embodiment BP, wherein the at least one first metal comprises one or more nanowires, nanocubes, nanorods, nanopyramids, or nanotubes.

BR. The at least one article of embodiment BP, wherein the at least one first metal comprises at least one object having an average diameter of between about 10 nm and about 500 nm.

BS. The at least one article of embodiment BP, wherein the at least one first metal comprises at least one object having an aspect ratio from about 50 to about 10,000.

BT. The method according to embodiment AU, wherein nitric oxide co-production is reduced by a factor of at least 100 relative to copper chloride catalyzed metal reduction.

BU. The method according to embodiment AU, wherein nitric oxide co-production is reduced by a factor of at least 1000 relative to copper chloride catalyzed metal reduction.

BV. The method according to embodiment AU, wherein no detectable nitric oxide is co-produced.

BW. At least one metal nanowire with an average diameter of between about 10 nm and about 150 nm, and with an aspect ratio from about 50 to about 10,000.

BX. The nanowire of embodiment BW, wherein the at least one metal comprises at least one coinage metal.

BY. The nanowire of embodiment BW, wherein the at least one metal comprises at least one element of IUPAC Group 11.

BZ. The nanowire of embodiment BW, wherein the at least one metal comprises silver.

CA. At least one article comprising the at least one metal nanowire of embodiment BW.

U.S. Provisional Application No. 61/494,072, filed Jun. 7, 2011, entitled NANOWIRE PREPARATION METHODS, COMPOSITIONS, AND ARTICLES, which is hereby incorporated by reference in its entirety, disclosed the following 20 exemplary non-limiting embodiments:

CB. A method comprising:
 providing at least one first composition comprising at least one first reducible metal ion, and
 reducing the at least one first reducible metal ion to at least one first metal in the presence of at least one second metal ion comprising at least one lanthanide element or actinide element.

CC. The method according to embodiment CB, wherein the at least one first reducible metal ion comprises at least one coinage metal ion.

CD. The method according to embodiment CB, wherein the at least one first reducible metal ion comprises at least one ion of an IUPAC Group 11 element.

CE. The method according to embodiment CB, wherein the at least one first reducible metal ion comprises at least one silver ion.

CF. The method according to embodiment CB, wherein the at least one composition comprises silver nitrate.

CG. The method according to embodiment CB, wherein the at least one second metal ion comprises at least one lanthanum ion or actinide ion.

CH. The method according to embodiment CB, wherein the at least one second metal ion comprises lanthanum in its +3 oxidation state.

CJ. The method according to embodiment CB, wherein the reduction occurs in the presence of at least one protecting agent.

CK. The method according to embodiment CB, wherein the reduction occurs in the presence of at least one polyol.

CL. A product comprising the at least one first metal produced by the method according to embodiment CB.

CM. The product according to embodiment CL comprising at least one metal nanowire.

CN. An article comprising the product according to embodiment CL.

CP. A composition comprising at least one metal nanowire, at least one chloride ion, and at least one ion of a lanthanide element or at least one ion of an actinide element.

CQ. The composition according to embodiment CP, wherein the at least one metal nanowire comprises at least one silver nanowire.

CR. The composition according to embodiment CP, wherein the at least one metal nanowire comprises an average diameter between about 10 nm and about 500 nm.

CS. The composition according to embodiment CP, wherein the at least one metal nanowire comprises an aspect ratio between about 50 and about 10,000.

CT. The composition according to embodiment CP, wherein the at least one metal nanowire comprises an average diameter between about 10 nm and about 150 nm, and an aspect ratio between about 50 and about 10,000.

CU. A product comprising the at least one metal nanowire of the composition of embodiment CP.

CV. An article comprising the at least one product according to embodiment CU.

CW. The article according to embodiment CV comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/521,776, filed Aug. 10, 2011, entitled NANOWIRE PREPARATION METHODS, COMPOSITIONS, AND ARTICLES, which is hereby incorporated by reference in its entirety, disclosed the following 20 exemplary non-limiting embodiments:

CX. A method comprising:
 providing at least one first composition comprising at least one first reducible metal ion, and
 reducing the at least one first reducible metal ion to at least one first metal in the presence of at least one second metal ion comprising at least one lanthanide element or actinide element.

CY. The method according to embodiment CX, wherein the at least one first reducible metal ion comprises at least one coinage metal ion.

CZ. The method according to embodiment CX, wherein the at least one first reducible metal ion comprises at least one ion of an IUPAC Group 11 element.

DA. The method according to embodiment CX, wherein the at least one first reducible metal ion comprises at least one silver ion.

DB. The method according to embodiment CX, wherein the at least one composition comprises silver nitrate.

DC. The method according to embodiment CX, wherein the at least one second metal ion comprises at least one praseodymium ion.

DD. The method according to embodiment CX, wherein the at least one second metal ion comprises praseodymium in its +3 oxidation state.
DE. The method according to embodiment CX, wherein the reduction occurs in the presence of at least one protecting agent.
DF. The method according to embodiment CX, wherein the reduction occurs in the presence of at least one polyol.
DG. A product comprising the at least one first metal produced by the method according to embodiment CX.
DH. The product according to embodiment DG comprising at least one metal nanowire.
DJ. An article comprising the product according to embodiment DG.
DK. A composition comprising at least one metal nanowire, at least one chloride ion, and at least one ion of a lanthanide element or at least one ion of an actinide element.
DL. The composition according to embodiment DK, wherein the at least one metal nanowire comprises at least one silver nanowire.
DM. The composition according to embodiment DK, wherein the at least one metal nanowire comprises an average diameter between about 10 nm and about 500 nm.
DN. The composition according to embodiment DK, wherein the at least one metal nanowire comprises an aspect ratio between about 50 and about 10,000.
DP. The composition according to embodiment DK, wherein the at least one metal nanowire comprises an average diameter between about 10 nm and about 150 nm, and an aspect ratio between about 50 and about 10,000.
DQ. A product comprising the at least one metal nanowire of the composition of embodiment DK.
DR. An article comprising the at least one product according to embodiment DQ.
DS. The article according to embodiment DR comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/521,859, filed Aug. 10, 2011, entitled NANOWIRE PREPARATION METHODS, COMPOSITIONS, AND ARTICLES, which is hereby incorporated by reference in its entirety, disclosed the following 20 exemplary non-limiting embodiments:

DT. A method comprising:
providing at least one first composition comprising at least one first reducible metal ion, and
reducing the at least one first reducible metal ion to at least one first metal in the presence of at least one second metal ion comprising at least one lanthanide element or actinide element.
DU. The method according to embodiment DT, wherein the at least one first reducible metal ion comprises at least one coinage metal ion.
DV. The method according to embodiment DT, wherein the at least one first reducible metal ion comprises at least one ion of an IUPAC Group 11 element.
DW. The method according to embodiment DT, wherein the at least one first reducible metal ion comprises at least one silver ion.
DX. The method according to embodiment DT, wherein the at least one composition comprises silver nitrate.
DY. The method according to embodiment DT, wherein the at least one second metal ion comprises at least one erbium ion.
DZ. The method according to embodiment DT, wherein the at least one second metal ion comprises erbium in its +3 oxidation state.
EA. The method according to embodiment DT, wherein the reduction occurs in the presence of at least one protecting agent.
EB. The method according to embodiment DT, wherein the reduction occurs in the presence of at least one polyol.
EC. A product comprising the at least one first metal produced by the method according to embodiment DT.
ED. The product according to embodiment EC comprising at least one metal nanowire.
EE. An article comprising the product according to embodiment EC.
EF. A composition comprising at least one metal nanowire, at least one chloride ion, and at least one ion of a lanthanide element or at least one ion of an actinide element.
EG. The composition according to embodiment EF, wherein the at least one metal nanowire comprises at least one silver nanowire.
EH. The composition according to embodiment EF, wherein the at least one metal nanowire comprises an average diameter between about 10 nm and about 500 nm.
EJ. The composition according to embodiment EF, wherein the at least one metal nanowire comprises an aspect ratio between about 50 and about 10,000.
EK. The composition according to embodiment EF, wherein the at least one metal nanowire comprises an average diameter between about 10 nm and about 150 nm, and an aspect ratio between about 50 and about 10,000.
EL. A product comprising the at least one metal nanowire of the composition of embodiment EF.
EM. An article comprising the at least one product according to embodiment EL.
EN. The article according to embodiment EM comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/521,867, filed Aug. 10, 2011, entitled NANOWIRE PREPARATION METHODS, COMPOSITIONS, AND ARTICLES, which is hereby incorporated by reference in its entirety, disclosed the following 20 exemplary non-limiting embodiments:

EP. A method comprising:
providing at least one first composition comprising at least one first reducible metal ion, and
reducing the at least one first reducible metal ion to at least one first metal in the presence of at least one second metal ion comprising at least one lanthanide element or actinide element.
EQ. The method according to embodiment EP, wherein the at least one first reducible metal ion comprises at least one coinage metal ion.
ER. The method according to embodiment EP, wherein the at least one first reducible metal ion comprises at least one ion of an IUPAC Group 11 element.
ES. The method according to embodiment EP, wherein the at least one first reducible metal ion comprises at least one silver ion.
ET. The method according to embodiment EP, wherein the at least one composition comprises silver nitrate.
EU. The method according to embodiment EP, wherein the at least one second metal ion comprises at least one thulium ion.
EV. The method according to embodiment EP, wherein the at least one second metal ion comprises thulium in its +3 oxidation state.
EW. The method according to embodiment EP, wherein the reduction occurs in the presence of at least one protecting agent.

EX. The method according to embodiment EQ, wherein the reduction occurs in the presence of at least one polyol.

EY. A product comprising the at least one first metal produced by the method according to embodiment EP.

EZ. The product according to embodiment EY comprising at least one metal nanowire.

FA. An article comprising the product according to embodiment EY.

FB. A composition comprising at least one metal nanowire, at least one chloride ion, and at least one ion of a lanthanide element or at least one ion of an actinide element.

FC. The composition according to embodiment EZ, wherein the at least one metal nanowire comprises at least one silver nanowire.

FD. The composition according to embodiment EZ, wherein the at least one metal nanowire comprises an average diameter between about 10 nm and about 500 nm.

FE. The composition according to embodiment EZ, wherein the at least one metal nanowire comprises an aspect ratio between about 50 and about 10,000.

FF. The composition according to embodiment EZ, wherein the at least one metal nanowire comprises an average diameter between about 10 nm and about 150 nm, and an aspect ratio between about 50 and about 10,000.

FG. A product comprising the at least one metal nanowire of the composition of embodiment EZ.

FH. An article comprising the at least one product according to embodiment FE.

FJ. The article according to embodiment FH comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,258, filed Aug. 11, 2011, entitled NANOWIRE PREPARATION METHODS, COMPOSITIONS, AND ARTICLES, which is hereby incorporated by reference in its entirety, disclosed the following 20 exemplary non-limiting embodiments:

FK. A method comprising:
providing at least one first composition comprising at least one first reducible metal ion, and
reducing the at least one first reducible metal ion to at least one first metal in the presence of at least one second metal ion comprising at least one lanthanide element or actinide element.

FL. The method according to embodiment FK, wherein the at least one first reducible metal ion comprises at least one coinage metal ion.

FM. The method according to embodiment FK, wherein the at least one first reducible metal ion comprises at least one ion of an IUPAC Group 11 element.

FN. The method according to embodiment FK, wherein the at least one first reducible metal ion comprises at least one silver ion.

FP. The method according to embodiment FK, wherein the at least one composition comprises silver nitrate.

FQ. The method according to embodiment FK, wherein the at least one second metal ion comprises at least one europium ion.

FR. The method according to embodiment FK, wherein the at least one second metal ion comprises europium in its +3 oxidation state.

FS. The method according to embodiment FK, wherein the reduction occurs in the presence of at least one protecting agent.

FT. The method according to embodiment FK, wherein the reduction occurs in the presence of at least one polyol.

FU. A product comprising the at least one first metal produced by the method according to embodiment FK.

FV. The product according to embodiment FU comprising at least one metal nanowire.

FW. An article comprising the product according to embodiment FU.

FX. A composition comprising at least one metal nanowire, at least one chloride ion, and at least one ion of a lanthanide element or at least one ion of an actinide element.

FY. The composition according to embodiment FX, wherein the at least one metal nanowire comprises at least one silver nanowire.

FZ. The composition according to embodiment FX, wherein the at least one metal nanowire comprises an average diameter between about 10 nm and about 500 nm.

GA. The composition according to embodiment FX, wherein the at least one metal nanowire comprises an aspect ratio between about 50 and about 10,000.

GB. The composition according to embodiment FX, wherein the at least one metal nanowire comprises an average diameter between about 10 nm and about 150 nm, and an aspect ratio between about 50 and about 10,000.

GC. A product comprising the at least one metal nanowire of the composition of embodiment FX.

GD. An article comprising the at least one product according to embodiment GB.

GE. The article according to embodiment GC comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,738, filed Aug. 12, 2011, entitled NANOWIRE PREPARATION METHODS, COMPOSITIONS, AND ARTICLES, which is hereby incorporated by reference in its entirety, disclosed the following 20 exemplary non-limiting embodiments:

GF. A method comprising:
providing at least one first composition comprising at least one first reducible metal ion, and
reducing the at least one first reducible metal ion to at least one first metal in the presence of at least one second metal ion comprising at least one lanthanide element or actinide element.

GG. The method according to embodiment GF, wherein the at least one first reducible metal ion comprises at least one coinage metal ion.

GH. The method according to embodiment GF, wherein the at least one first reducible metal ion comprises at least one ion of an IUPAC Group 11 element.

GJ. The method according to embodiment GF, wherein the at least one first reducible metal ion comprises at least one silver ion.

GK. The method according to embodiment GF, wherein the at least one composition comprises silver nitrate.

GL. The method according to embodiment GF, wherein the at least one second metal ion comprises at least one dysprosium ion.

GM. The method according to embodiment GF, wherein the at least one second metal ion comprises dysprosium in its +3 oxidation state.

GN. The method according to embodiment GF, wherein the reduction occurs in the presence of at least one protecting agent.

GP. The method according to embodiment GF, wherein the reduction occurs in the presence of at least one polyol.

GQ. A product comprising the at least one first metal produced by the method according to embodiment GF.

GR. The product according to embodiment GQ comprising at least one metal nanowire.

GS. An article comprising the product according to embodiment GQ.

GT. A composition comprising at least one metal nanowire, at least one chloride ion, and at least one ion of a lanthanide element or at least one ion of an actinide element.

GU. The composition according to embodiment GT, wherein the at least one metal nanowire comprises at least one silver nanowire.

GV. The composition according to embodiment GT, wherein the at least one metal nanowire comprises an average diameter between about 10 nm and about 500 nm.

GW. The composition according to embodiment GT, wherein the at least one metal nanowire comprises an aspect ratio between about 50 and about 10,000.

GX. The composition according to embodiment GT, wherein the at least one metal nanowire comprises an average diameter between about 10 nm and about 150 nm, and an aspect ratio between about 50 and about 10,000.

GY. A product comprising the at least one metal nanowire of the composition of embodiment GT.

GZ. An article comprising the at least one product according to embodiment GY.

HA. The article according to embodiment GZ comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,749, filed Aug. 12, 2011, entitled NANOWIRE PREPARATION METHODS, COMPOSITIONS, AND ARTICLES, which is hereby incorporated by reference in its entirety, disclosed the following 20 exemplary non-limiting embodiments:

HB. A method comprising:
 providing at least one first composition comprising at least one first reducible metal ion, and
 reducing the at least one first reducible metal ion to at least one first metal in the presence of at least one second metal ion comprising at least one lanthanide element or actinide element.

HC. The method according to embodiment HB, wherein the at least one first reducible metal ion comprises at least one coinage metal ion.

HD. The method according to embodiment HB, wherein the at least one first reducible metal ion comprises at least one ion of an IUPAC Group 11 element.

HE. The method according to embodiment HB, wherein the at least one first reducible metal ion comprises at least one silver ion.

HF. The method according to embodiment HB, wherein the at least one composition comprises silver nitrate.

HG. The method according to embodiment HB, wherein the at least one second metal ion comprises at least one gadolinium ion.

HH. The method according to embodiment HB, wherein the at least one second metal ion comprises gadolinium in its +3 oxidation state.

HJ. The method according to embodiment HB, wherein the reduction occurs in the presence of at least one protecting agent.

HK. The method according to embodiment HB, wherein the reduction occurs in the presence of at least one polyol.

HL. A product comprising the at least one first metal produced by the method according to embodiment HB.

HM. The product according to embodiment HL comprising at least one metal nanowire.

HN. An article comprising the product according to embodiment HL.

HP. A composition comprising at least one metal nanowire, at least one chloride ion, and at least one ion of a lanthanide element or at least one ion of an actinide element.

HQ. The composition according to embodiment HP, wherein the at least one metal nanowire comprises at least one silver nanowire.

HR. The composition according to embodiment HP, wherein the at least one metal nanowire comprises an average diameter between about 10 nm and about 500 nm.

HS. The composition according to embodiment HP, wherein the at least one metal nanowire comprises an aspect ratio between about 50 and about 10,000.

HT. The composition according to embodiment HP, wherein the at least one metal nanowire comprises an average diameter between about 10 nm and about 150 nm, and an aspect ratio between about 50 and about 10,000.

HU. A product comprising the at least one metal nanowire of the composition of embodiment HP.

HV. An article comprising the at least one product according to embodiment HU.

HW. The article according to embodiment HV comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,757, filed Aug. 12, 2011, entitled NANOWIRE PREPARATION METHODS, COMPOSITIONS, AND ARTICLES, which is hereby incorporated by reference in its entirety, disclosed the following 20 exemplary non-limiting embodiments:

HX. A method comprising:
 providing at least one first composition comprising at least one first reducible metal ion, and
 reducing the at least one first reducible metal ion to at least one first metal in the presence of at least one second metal ion comprising at least one lanthanide element or actinide element.

HY. The method according to embodiment HX, wherein the at least one first reducible metal ion comprises at least one coinage metal ion.

HZ. The method according to embodiment HX, wherein the at least one first reducible metal ion comprises at least one ion of an IUPAC Group 11 element.

JA. The method according to embodiment HX, wherein the at least one first reducible metal ion comprises at least one silver ion.

JB. The method according to embodiment HX, wherein the at least one composition comprises silver nitrate.

JC. The method according to embodiment HX, wherein the at least one second metal ion comprises at least one terbium ion.

JD. The method according to embodiment HX, wherein the at least one second metal ion comprises terbium in its +3 oxidation state.

JE. The method according to embodiment HX, wherein the reduction occurs in the presence of at least one protecting agent.

JF. The method according to embodiment HX, wherein the reduction occurs in the presence of at least one polyol.

JG. A product comprising the at least one first metal produced by the method according to embodiment HX.

JH. The product according to embodiment JG comprising at least one metal nanowire.

JJ. An article comprising the product according to embodiment JG.

JK. A composition comprising at least one metal nanowire, at least one chloride ion, and at least one ion of a lanthanide element or at least one ion of an actinide element.

JL. The composition according to embodiment JK, wherein the at least one metal nanowire comprises at least one silver nanowire.

JM. The composition according to embodiment JK, wherein the at least one metal nanowire comprises an average diameter between about 10 nm and about 500 nm.

JN. The composition according to embodiment JK, wherein the at least one metal nanowire comprises an aspect ratio between about 50 and about 10,000.

JP. The composition according to embodiment JK, wherein the at least one metal nanowire comprises an average diameter between about 10 nm and about 150 nm, and an aspect ratio between about 50 and about 10,000.

JQ. A product comprising the at least one metal nanowire of the composition of embodiment JK.

JR. An article comprising the at least one product according to embodiment JQ.

JS. The article according to embodiment JR comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/522,766, filed Aug. 12, 2011, entitled NANOWIRE PREPARATION METHODS, COMPOSITIONS, AND ARTICLES, which is hereby incorporated by reference in its entirety, disclosed the following 20 exemplary non-limiting embodiments:

JT. A method comprising:
providing at least one first composition comprising at least one first reducible metal ion, and
reducing the at least one first reducible metal ion to at least one first metal in the presence of at least one second metal ion comprising at least one lanthanide element or actinide element.

JU. The method according to embodiment JT, wherein the at least one first reducible metal ion comprises at least one coinage metal ion.

JV. The method according to embodiment JT, wherein the at least one first reducible metal ion comprises at least one ion of an IUPAC Group 11 element.

JW. The method according to embodiment JT, wherein the at least one first reducible metal ion comprises at least one silver ion.

JX. The method according to embodiment JT, wherein the at least one composition comprises silver nitrate.

JY. The method according to embodiment JT, wherein the at least one second metal ion comprises at least one holmium ion.

JZ. The method according to embodiment JT, wherein the at least one second metal ion comprises holmium in its +3 oxidation state.

KA. The method according to embodiment JT, wherein the reduction occurs in the presence of at least one protecting agent.

KB. The method according to embodiment JT, wherein the reduction occurs in the presence of at least one polyol.

KC. A product comprising the at least one first metal produced by the method according to embodiment JT.

KD. The product according to embodiment KC comprising at least one metal nanowire.

KE. An article comprising the product according to embodiment KC.

KF. A composition comprising at least one metal nanowire, at least one chloride ion, and at least one ion of a lanthanide element or at least one ion of an actinide element.

KG. The composition according to embodiment KF, wherein the at least one metal nanowire comprises at least one silver nanowire.

KH. The composition according to embodiment KF, wherein the at least one metal nanowire comprises an average diameter between about 10 nm and about 500 nm.

KJ. The composition according to embodiment KF, wherein the at least one metal nanowire comprises an aspect ratio between about 50 and about 10,000.

KK. The composition according to embodiment KF, wherein the at least one metal nanowire comprises an average diameter between about 10 nm and about 150 nm, and an aspect ratio between about 50 and about 10,000.

KL. A product comprising the at least one metal nanowire of the composition of embodiment KF.

KM. An article comprising the at least one product according to embodiment KL.

KN. The article according to embodiment KM comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/523,419, filed Aug. 15, 2011, entitled NANOWIRE PREPARATION METHODS, COMPOSITIONS, AND ARTICLES, which is hereby incorporated by reference in its entirety, disclosed the following 20 exemplary non-limiting embodiments:

KP. A method comprising:
providing at least one first composition comprising at least one first reducible metal ion, and
reducing the at least one first reducible metal ion to at least one first metal in the presence of at least one second metal ion comprising at least one lanthanide element or actinide element.

KQ. The method according to embodiment KP, wherein the at least one first reducible metal ion comprises at least one coinage metal ion.

KR. The method according to embodiment KP, wherein the at least one first reducible metal ion comprises at least one ion of an IUPAC Group 11 element.

KS. The method according to embodiment KP, wherein the at least one first reducible metal ion comprises at least one silver ion.

KT. The method according to embodiment KP, wherein the at least one composition comprises silver nitrate.

KU. The method according to embodiment KP, wherein the at least one second metal ion comprises at least one ytterbium ion.

KV. The method according to embodiment KP, wherein the at least one second metal ion comprises ytterbium in its +3 oxidation state.

KW. The method according to embodiment KP, wherein the reduction occurs in the presence of at least one protecting agent.

KX. The method according to embodiment KP, wherein the reduction occurs in the presence of at least one polyol.

KY. A product comprising the at least one first metal produced by the method according to embodiment KP.

KZ. The product according to embodiment KY comprising at least one metal nanowire.

LA. An article comprising the product according to embodiment KY.

LB. A composition comprising at least one metal nanowire, at least one chloride ion, and at least one ion of a lanthanide element or at least one ion of an actinide element.

LC. The composition according to embodiment LB, wherein the at least one metal nanowire comprises at least one silver nanowire.

LD. The composition according to embodiment LB, wherein the at least one metal nanowire comprises an average diameter between about 10 nm and about 500 nm.

LE. The composition according to embodiment LB, wherein the at least one metal nanowire comprises an aspect ratio between about 50 and about 10,000.

LF. The composition according to embodiment LB, wherein the at least one metal nanowire comprises an average diameter between about 10 nm and about 150 nm, and an aspect ratio between about 50 and about 10,000.

LG. A product comprising the at least one metal nanowire of the composition of embodiment LB.

LH. An article comprising the at least one product according to embodiment 1LG.

LJ. The article according to embodiment LH comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/523,882, filed Aug. 16, 2011, entitled NANOWIRE PREPARATION METHODS, COMPOSITIONS, AND ARTICLES, which is hereby incorporated by reference in its entirety, disclosed the following 20 exemplary non-limiting embodiments:

LK. A method comprising:
providing at least one first composition comprising at least one first reducible metal ion, and
reducing the at least one first reducible metal ion to at least one first metal in the presence of at least one second metal ion comprising at least one lanthanide element or actinide element.

LL. The method according to embodiment LK, wherein the at least one first reducible metal ion comprises at least one coinage metal ion.

LM. The method according to embodiment LK, wherein the at least one first reducible metal ion comprises at least one ion of an IUPAC Group 11 element.

LN. The method according to embodiment LK, wherein the at least one first reducible metal ion comprises at least one silver ion.

LP. The method according to embodiment LK, wherein the at least one composition comprises silver nitrate.

LQ. The method according to embodiment LK, wherein the at least one second metal ion comprises at least one neodymium ion.

LR. The method according to embodiment LK, wherein the at least one second metal ion comprises neodymium in its +3 oxidation state.

LS. The method according to embodiment LK, wherein the reduction occurs in the presence of at least one protecting agent.

LT. The method according to embodiment LK, wherein the reduction occurs in the presence of at least one polyol.

LU. A product comprising the at least one first metal produced by the method according to embodiment LK.

LV. The product according to embodiment LU comprising at least one metal nanowire.

LW. An article comprising the product according to embodiment LV.

LX. A composition comprising at least one metal nanowire, at least one chloride ion, and at least one ion of a lanthanide element or at least one ion of an actinide element.

LY. The composition according to embodiment LX, wherein the at least one metal nanowire comprises at least one silver nanowire.

LZ. The composition according to embodiment LX, wherein the at least one metal nanowire comprises an average diameter between about 10 nm and about 500 nm.

MA. The composition according to embodiment LX, wherein the at least one metal nanowire comprises an aspect ratio between about 50 and about 10,000.

MB. The composition according to embodiment LX, wherein the at least one metal nanowire comprises an average diameter between about 10 nm and about 150 nm, and an aspect ratio between about 50 and about 10,000.

MC. A product comprising the at least one metal nanowire of the composition of embodiment LX.

MD. An article comprising the at least one product according to embodiment MC.

ME. The article according to embodiment MD comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

U.S. Provisional Application No. 61/523,893, filed Aug. 16, 2011, entitled NANOWIRE PREPARATION METHODS, COMPOSITIONS, AND ARTICLES, which is hereby incorporated by reference in its entirety, disclosed the following 20 exemplary non-limiting embodiments:

MF. A method comprising:
providing at least one first composition comprising at least one first reducible metal ion, and
reducing the at least one first reducible metal ion to at least one first metal in the presence of at least one second metal ion comprising at least one lanthanide element or actinide element.

MG. The method according to embodiment MF, wherein the at least one first reducible metal ion comprises at least one coinage metal ion.

MH. The method according to embodiment MF, wherein the at least one first reducible metal ion comprises at least one ion of an IUPAC Group 11 element.

MJ. The method according to embodiment MF, wherein the at least one first reducible metal ion comprises at least one silver ion.

MK. The method according to embodiment MF, wherein the at least one composition comprises silver nitrate.

ML. The method according to embodiment MF, wherein the at least one second metal ion comprises at least one lutetium ion.

MM. The method according to embodiment MF, wherein the at least one second metal ion comprises lutetium in its +3 oxidation state.

MN. The method according to embodiment MF, wherein the reduction occurs in the presence of at least one protecting agent.

MP. The method according to embodiment MF, wherein the reduction occurs in the presence of at least one polyol.

MQ. A product comprising the at least one first metal produced by the method according to embodiment MF.

MR. The product according to embodiment MQ comprising at least one metal nanowire.

MS. An article comprising the product according to embodiment MQ.

MT. A composition comprising at least one metal nanowire, at least one chloride ion, and at least one ion of a lanthanide element or at least one ion of an actinide element.
MU. The composition according to embodiment MT, wherein the at least one metal nanowire comprises at least one silver nanowire.
MV. The composition according to embodiment MT, wherein the at least one metal nanowire comprises an average diameter between about 10 nm and about 500 nm.
MW. The composition according to embodiment MT, wherein the at least one metal nanowire comprises an aspect ratio between about 50 and about 10,000.
MX. The composition according to embodiment MT, wherein the at least one metal nanowire comprises an average diameter between about 10 nm and about 150 nm, and an aspect ratio between about 50 and about 10,000.
MY. A product comprising the at least one metal nanowire of the composition of embodiment MT.
MZ. An article comprising the at least one product according to embodiment MY.
NA. The article according to embodiment MZ comprising at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

EXAMPLES

Example 1

To a 500 mL reaction flask was added 280 mL ethylene glycol (EG) and 1.3 g of freshly prepared 15 mM $SmCl_3.6H_2O$ in EG. This solution was stripped of at least some dissolved gases by bubbling $N_2$ into the solution for at least 2 hrs using a glass pipette at room temperature with mechanical stirring while at 100 rpm. (This operation will be referred to as "degassing" the solution in the sequel.) Stock solutions of 0.25 M $AgNO_3$ in EG and 0.77 M (based on moles of repeat units) polyvinylpyrrolidinone (PVP, 55,000 molecular weight) in EG were also degassed by bubbling $N_2$ into the solutions for 60 minutes. Two syringes where loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge TEFLON® fluoropolymer syringe needles. The reaction was held at 145° C. for 90 minutes then allowed to cool to room temperature. From the cooled mixture, the reaction mixture was diluted by an equal volume of acetone, and centrifuged at 500 G for 45 minutes. The solid remaining after decantation of the supernatant was re-dispersed in 200 mL isopropanol, shaken 10 minutes and centrifuged again, decanted and diluted with 15 mL isopropanol.
FIG. 1 shows an optical microscope picture of the silver nanowires produced in the presence of this cation.

Example 2

Figure 2:
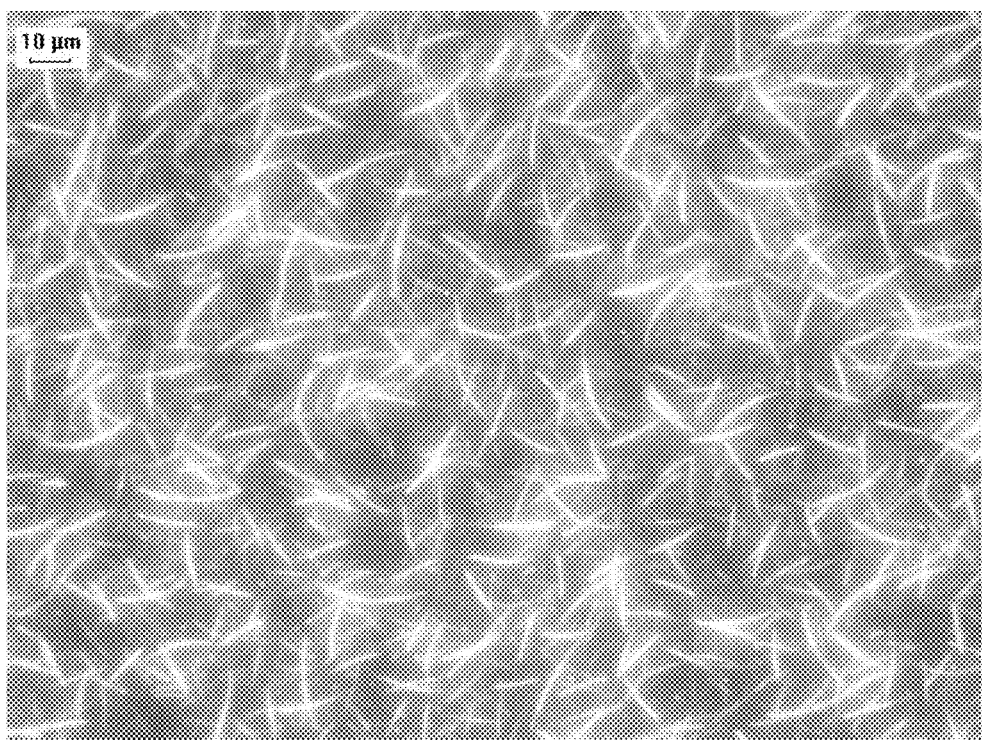
FIG. 2 shows an optical micrograph if the silver nanowire product of Example 2.

The procedure of Example 1 was repeated, using 2.2 g of freshly prepared 9.0 mM $CeCl_3.7H_2O$ in EG in place of the samarium solution. FIG. 2 shows an optical microscope picture of the silver nanowires produced in the presence of this cation.

Example 3

Figure 3:
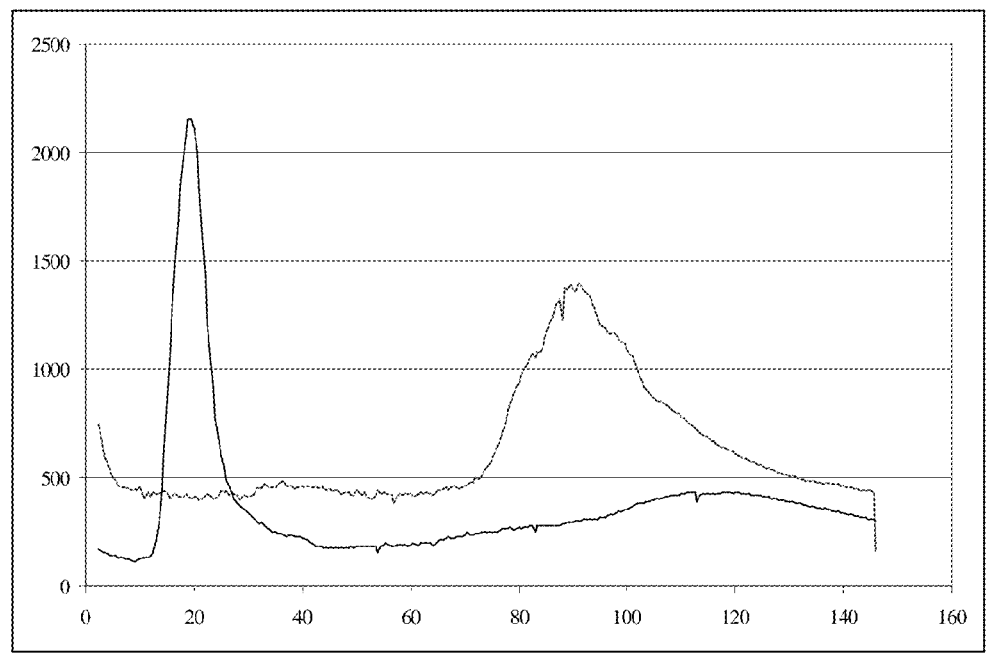
FIG. 3 shows the time evolution of nitric oxide detected in the headspace of the reaction media of Example 3 (red line with a peak at ca. 20 min) and Example 4 (black line with a peak at ca. 90 min).
Figure 4:
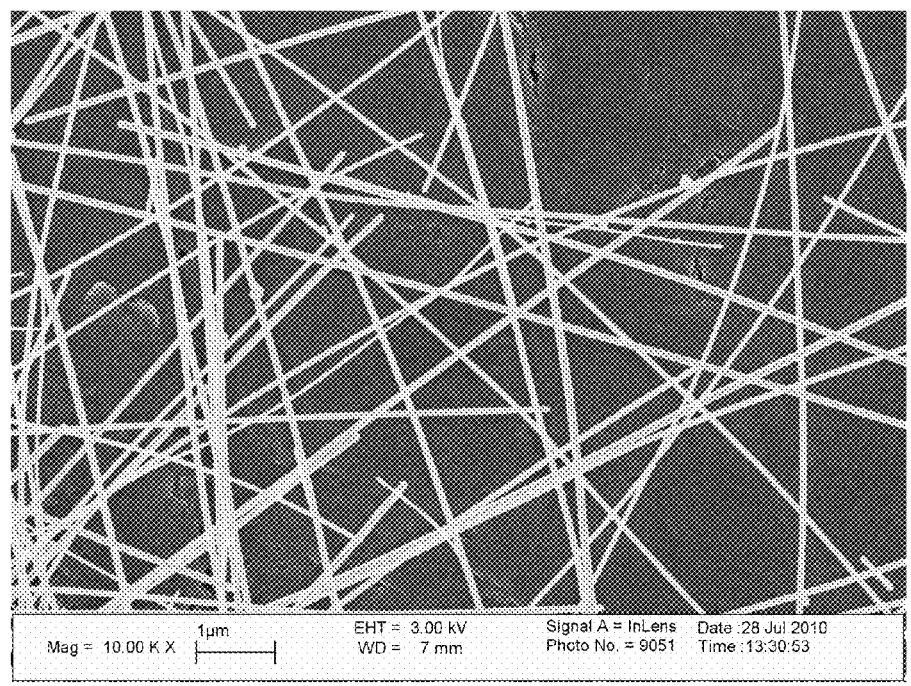
FIG. 4 shows a scanning electron micrograph of the silver nanowire product of Example 3.

To a 500 mL reaction flask containing 280 mL ethylene glycol (EG), 1.9 g of 9.3 mM $SnCl_2$ in EG was added. The reaction mixture was degassed for 2 hrs by bubbling $N_2$ into the mixture using a glass pipette at room temperature with mechanical stirring. Stock solutions of 0.25 M $AgNO_3$ in EG and 0.77 M polyvinylpyrrolidinone (PVP) in EG were also degassed by bubbling $N_2$ into the solutions for 60 min. Two syringes were loaded with 20 mL each of the $AgNO_3$ and PVP solutions. The reaction mixture was heated to 145° C. under $N_2$ and then, after the reaction mixture was held for 10 min, the $AgNO_3$ and PVP solutions were added at a constant rate over 25 minutes via 12 gauge TEFLON® fluoropolymer syringe needles. The reaction mixture was held at 145° C. for 90 minutes or longer, during which time samples were taken for optical microscopy. The reaction mixture was then allowed to cool to room temperature. From the cooled mixture, 15 mL was diluted with 35 mL of isopropanol (IPA), centrifuged 15 minutes at 1500 rpm, the supernatant removed by decantation, and the solid re-dispersed in 5 mL IPA. This sample was analyzed by scanning electron microscopy (SEM).
The reaction $N_2$/NO (headspace) exhaust was filtered, passed through a $CO_2$ cold-trap, and was analyzed using a MINIRAE® 2000 volatile organic compound monitor (RAE Systems, San Jose, Calif.), which was equipped with a photoionization detector, using a 30 second data collection rate. NO sampling began at the start of the $AgNO_3$/PVP addition and continued for 1 hour after heat was removed from the reaction (ambient cool-down).
The detected NO evolved during synthesis is plotted versus time (minutes) in the line of FIG. 3 that has a peak at approximately 20 min. FIG. 4 shows a scanning electron micrograph of the silver nanowires produced by this reaction. The average diameter of the nanowires was 73±26 nm, while the average length was 25±12 μm.

Example 4

Comparative

Figure 5:
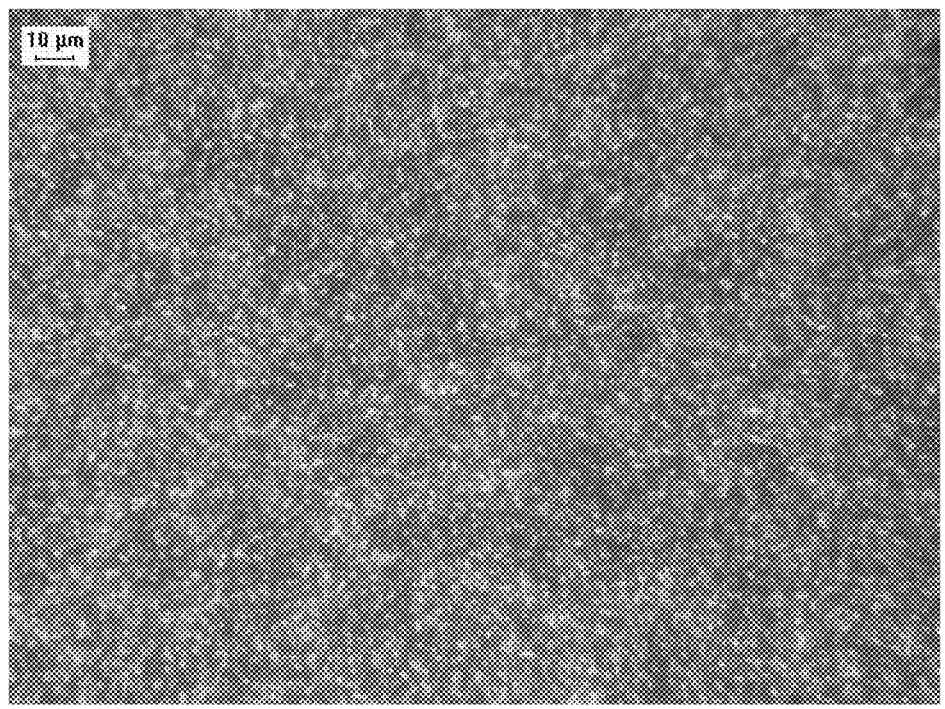
FIG. 5 shows an optical micrograph of the silver nanoparticle product of Example 4.

The procedure of Example 3 was repeated, substituting 0.10 g of the 9.3 mM $SnCl_2$ solution in EG for the 1.9 g used above. The detected NO evolved during synthesis is plotted in the line of FIG. 3 that has a peak at approximately 90 min. FIG. 5 shows an optical micrograph of the silver nanoparticles produced by this reaction.

Example 5

Comparative

Figure 6:
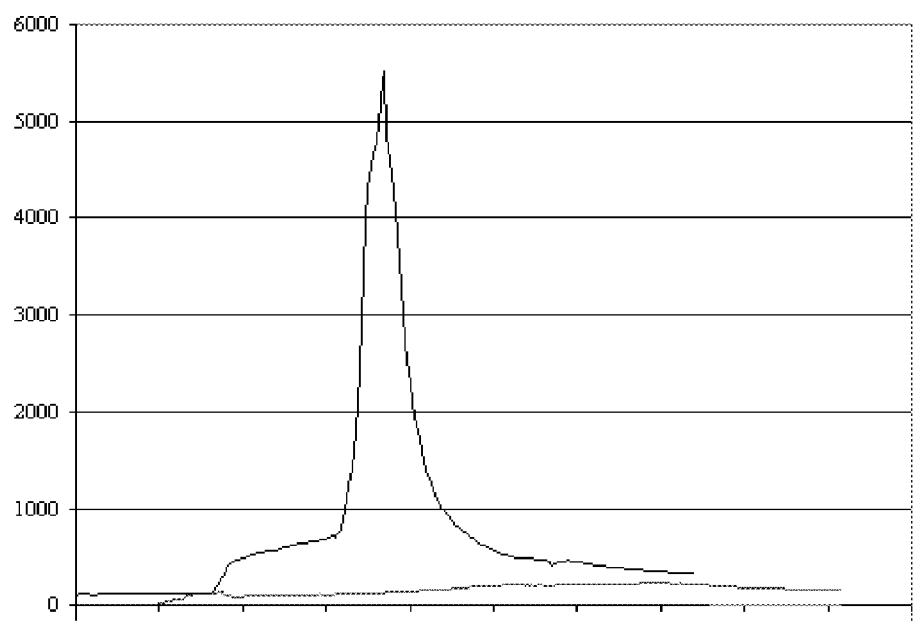
FIG. 6 shows nitric oxide concentration in the headspace of the silver nanowire reaction vessel as a function of time in minutes, for Examples 5-8.

To a 500 mL reaction flask containing 280 mL ethylene glycol (EG) was added 0.16 g of 7.0 mM $CuCl_2$ in EG and 0.60 g of 2.9 mM $Cu(acetylacetonate)_2$ in EG. The mixture was degassed for 2 hrs with nitrogen using a glass pipette. Stock solutions of 0.25 M $AgNO_3$ in EG and 0.84 M polyvinylpyrrolidinone (PVP) in EG were also degas sed by bubbling $N_2$ into the solutions at room temperature. Two syringes were loaded with 20 mL each of the $AgNO_3$ and PVP solutions. The reaction mixture was heated to 145-148° C. under $N_2$, at which time the $AgNO_3$ and PVP solutions were added at a constant rate over 25 minutes via 12 gauge TEFLON® fluoropolymer syringe needles. The reaction mixture continued to be held at this temperature for 90 min after addition of these solutions, after which it was allowed to cool to ambient temperature.
At the time of the introduction of the $AgNO_3$ and PVP solutions, the exhaust from the reaction flask headspace began to be sampled. The headspace exhaust passed through a carbon dioxide cold trap and was analyzed using a MINIRAE® 2000 volatile organic compound monitor (RAE Systems, San Jose, Calif.), which was equipped with a photoionization detector, using a 30 sec data collection rate. Analysis continued until 60 min after heat was removed from the reaction flask. The peak nitric oxide concentration in the headspace was 5500 ppm, as shown in FIG. 6, which shows nitric oxide concentration detected as a function of elapsed time in minutes.

Example 6

To a 500 mL reaction flask containing 280 mL ethylene glycol (EG) was added 3.3 g of 3 mM Fe(acetylacetonate)$_2$ in EG and 0.20 g of freshly prepared 52 mM diethyldichlorosilane in EG. The mixture was degassed for 2 hrs with nitrogen using a glass pipette. Stock solutions of 0.25 M AgNO$_3$ in EG and 0.84 M polyvinylpyrrolidinone (PVP) in EG were also degassed by bubbling N$_2$ into the solutions at room temperature. Two syringes were loaded with 20 mL each of the AgNO$_3$ and PVP solutions. The reaction mixture was heated to 145-148° C. under N$_2$, at which time the AgNO$_3$ and PVP solutions were added at a constant rate over 25 minutes via 12 gauge TEFLON® fluoropolymer syringe needles. The reaction mixture continued to be held at this temperature for 90 min after addition of these solutions, after which it was allowed to cool to ambient temperature.

Headspace nitric oxide was monitored according to the procedure of Example 5. The peak nitric acid concentration in the headspace was 15 ppm, as shown in FIG. 6.

Example 7

To a 500 mL reaction flask containing 280 mL ethylene glycol (EG) was added 1.3 g of freshly prepared 15 mM SmCl$_3$.6H$_2$O in EG. The mixture was degassed for 2 hrs with nitrogen using a glass pipette. Stock solutions of 0.25 M AgNO$_3$ in EG and 0.84 M polyvinylpyrrolidinone (PVP) in EG were also degassed by bubbling N$_2$ into the solutions at room temperature. Two syringes were loaded with 20 mL each of the AgNO$_3$ and PVP solutions. The reaction mixture was heated to 145-148° C. under N$_2$, at which time the AgNO$_3$ and PVP solutions were added at a constant rate over 25 minutes via 12 gauge TEFLON® fluoropolymer syringe needles. The reaction mixture continued to be held at this temperature for 120 min after addition of these solutions, after which it was allowed to cool to ambient temperature.

Headspace nitric oxide was monitored according to the procedure of Example 5. The peak nitric acid concentration in the headspace was 240 ppm, as shown in FIG. 6.

Example 8

To a 500 mL reaction flask containing 280 mL ethylene glycol (EG) was added 2.2 g of freshly prepared 9.0 mM CeCl$_3$.7H$_2$O in EG. The mixture was degassed for 2 hrs with nitrogen using a glass pipette. Stock solutions of 0.25 M AgNO$_3$ in EG and 0.84 M polyvinylpyrrolidinone (PVP) in EG were also degassed by bubbling N$_2$ into the solutions at room temperature. Two syringes were loaded with 20 mL each of the AgNO$_3$ and PVP solutions. The reaction mixture was heated to 145-148° C. under N$_2$, at which time the AgNO$_3$ and PVP solutions were added at a constant rate over 25 minutes via 12 gauge TEFLON® fluoropolymer syringe needles. The reaction mixture continued to be held at this temperature for 90 min after addition of these solutions, after which it was allowed to cool to ambient temperature.

Headspace nitric oxide was monitored according to the procedure of Example 5. No nitric oxide (i.e., a "peak" of 0 ppm) was detected in the headspace, as shown in FIG. 6.

Example 9

A 500 mL reaction flask containing 280 mL ethylene glycol (EG) was agitated at 100 rpm and degas sed overnight at room temperature using nitrogen that was introduced below the liquid surface through a TEFLON® fluoropolymer tube. Afterwards, 15 mg of lanthanum (III) chloride heptahydrate was added to the reaction flask. Stock solutions of 0.25 M AgNO$_3$ in EG and 0.84 M polyvinylpyrrolidinone (PVP, 55,000 weight-average molecular weight) in EG were also degassed with nitrogen for 60 min, then 20 mL syringes of each were prepared. The flask was then heated to 145° C. while blanketing the reaction flask headspace with nitrogen. The AgNO$_3$ and PVP solutions were then added at a constant rate over 25 min via a 12 gauge a TEFLON® fluoropolymer syringe needle. The flask was then held at temperature for 90 min, after which it was allowed to cool down to ambient temperature.

Figure 7:
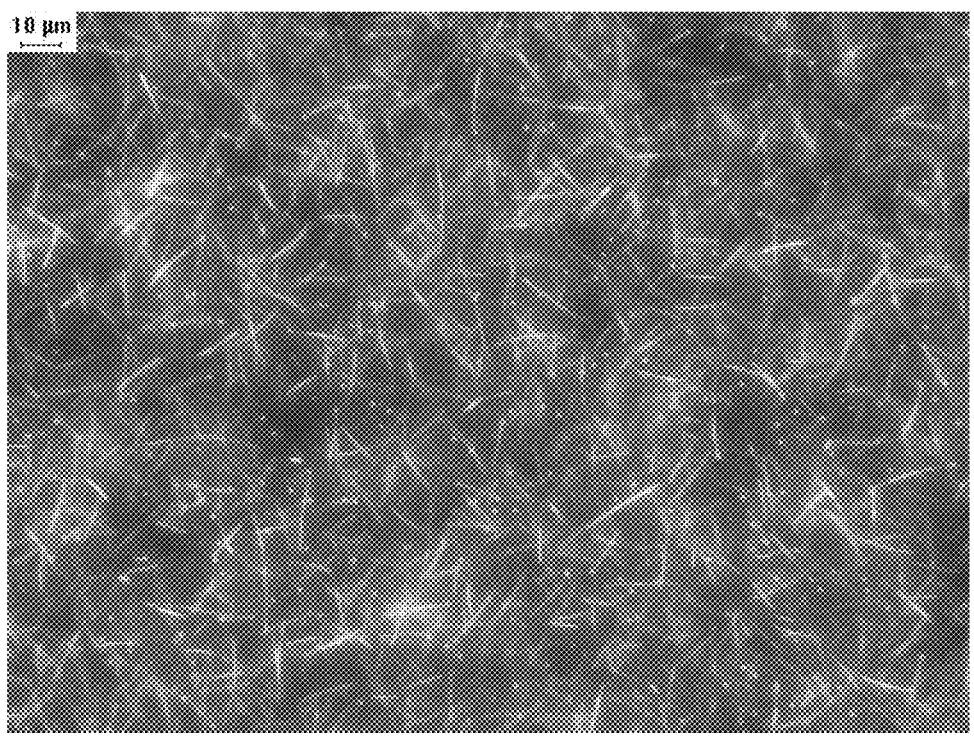
FIG. 7 shows an optical micrograph of the silver nanowire product of Example 9.

FIG. 7 shows an optical micrograph of the silver nanowire product, which had an average nanowire diameter of 58.3±27.8 nm, where the indicated average diameter and standard deviation were calculated from measurements of at least 100 wires.

Example 10

Figure 8:
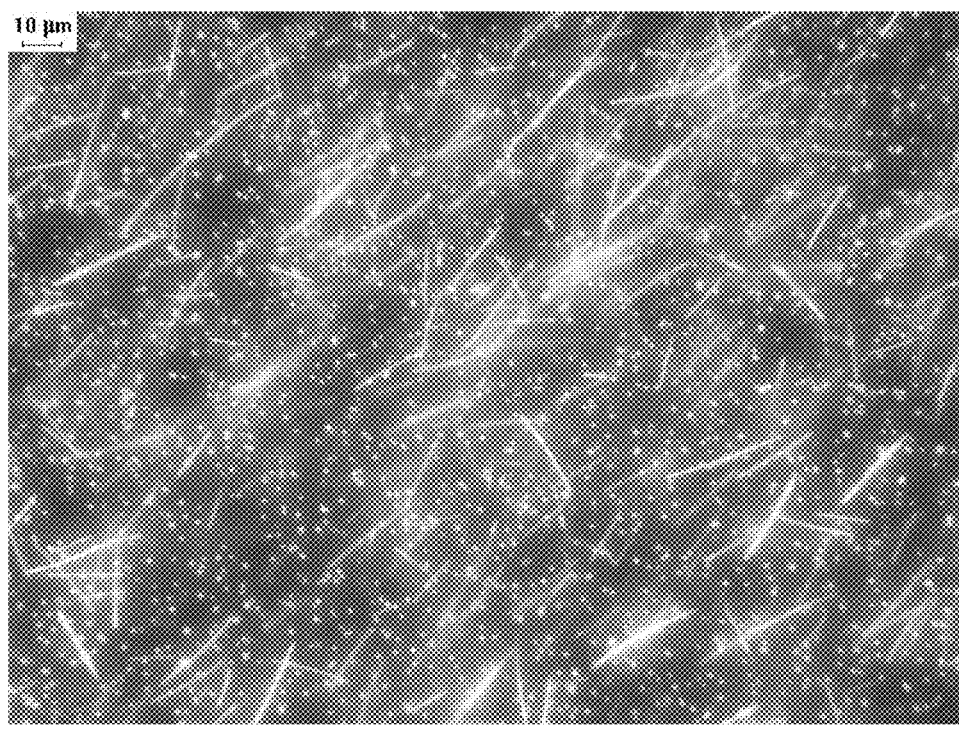
FIG. 8 shows an optical micrograph of the silver nanowire product of Example 10.

The procedure according to Example 9 was repeated, except that 59 mg of lanthanum (III) chloride heptahydrate was used and the reaction was carried out for 150 min before cooling. FIG. 8 shows an optical micrograph of the silver nanowire product, which had an average nanowire diameter of 88.2±33.8 nm.

Example 11

A 500 mL reaction flask containing 280 mL ethylene glycol (EG) and 16 mg of praseodymium (III) chloride heptahydrate was degas sed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.25 M AgNO$_3$ in EG and 0.84 M polyvinylpyrrolidinone (PVP, 55,000 weight-average molecular weight) in EG were also degassed with nitrogen, then 20 mL syringes of each were prepared. The AgNO$_3$ and PVP solutions were then added at a constant rate over 25 min via a 12 gauge a TEFLON® fluoropolymer syringe needle. The flask was then held at temperature for 60 min, after which it was allowed to cool down to ambient temperature.

Figure 9:
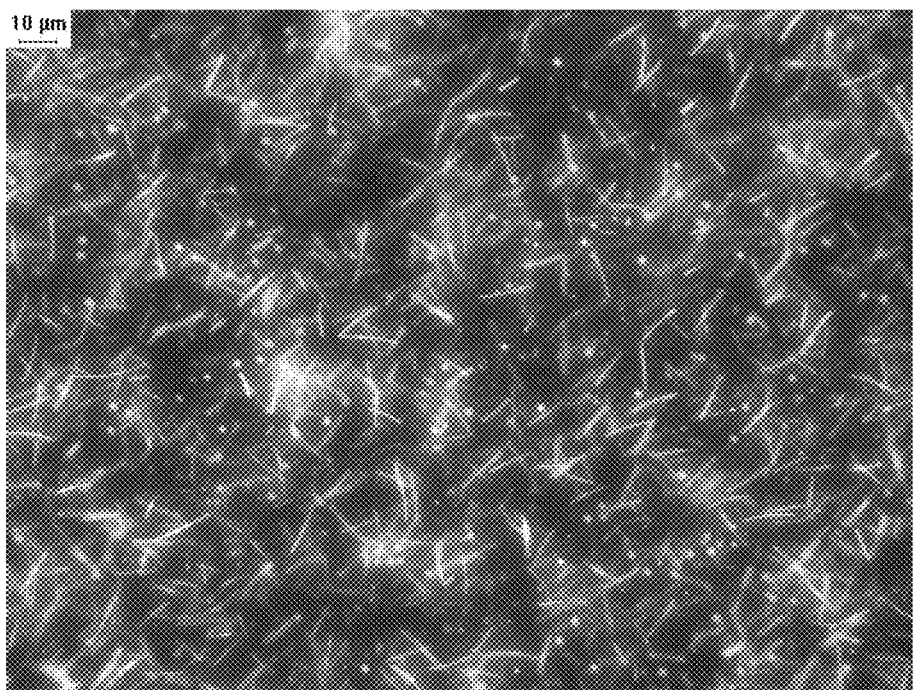
FIG. 9 shows an optical micrograph of the silver nanowire product of Example 11.

FIG. 9 shows an optical micrograph of the silver nanowire product, which had an average nanowire diameter of 53.8±11.8 nm and an average nanowire length of 12.1±6.2 µm, where the indicated average diameter, average length, and their standard deviations were calculated from measurements of at least 100 wires.

Example 12

The procedure of Example 11 was repeated, using 7.7 mg of praseodymium (III) chloride heptahydrate instead of 16 mg.

Figure 10:
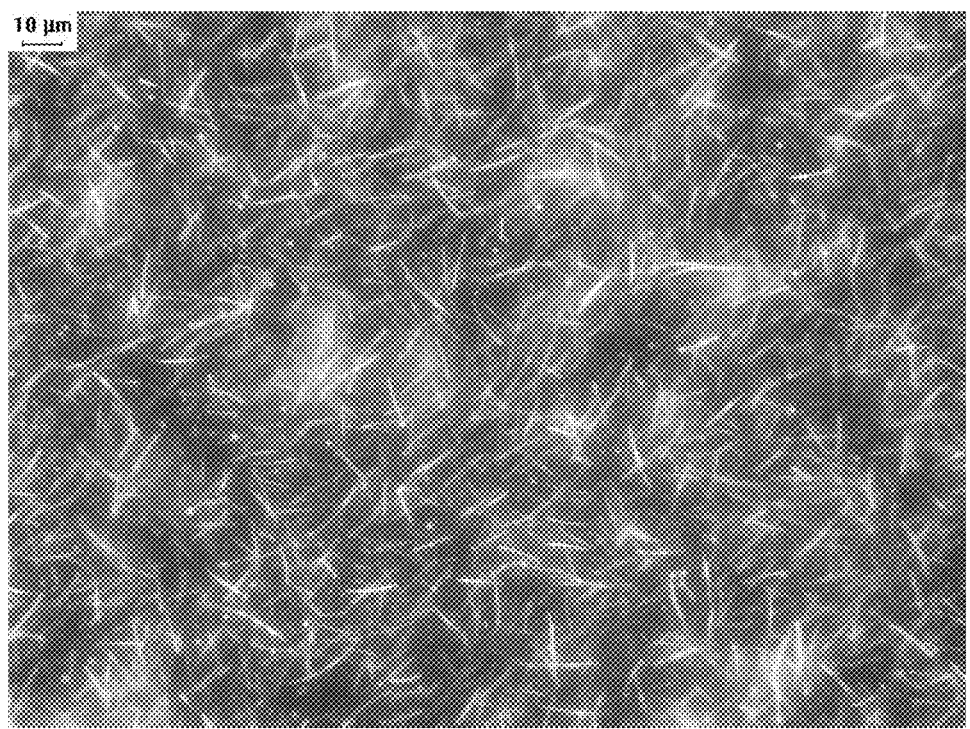
FIG. 10 shows an optical micrograph of the silver nanowire product of Example 12.

FIG. 10 shows an optical micrograph of the silver nanowire product, which had an average nanowire diameter of 53.4±13.3 nm and an average nanowire length of 8.8±5.4 µm.

Example 13

A 500 mL reaction flask containing 260 mL ethylene glycol (EG), 40 mL of 0.84 M polyvinylpyrrolidinone (PVP, 55,000 weight-average molecular weight) in EG, and 7.3 mg of erbium (III) chloride hexahydrate, was degas sed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. A stock solution of 0.50 M AgNO$_3$ in EG was also degassed with nitrogen, and then a 20 mL syringe of the degassed solution was prepared. The AgNO$_3$ solution was then added at a constant rate over 50 min via a 12 gauge TEFLON® fluoropolymer syringe needle. The flask was then held at temperature for 60 min, after which it was allowed to cool down to ambient temperature.

Figure 11:
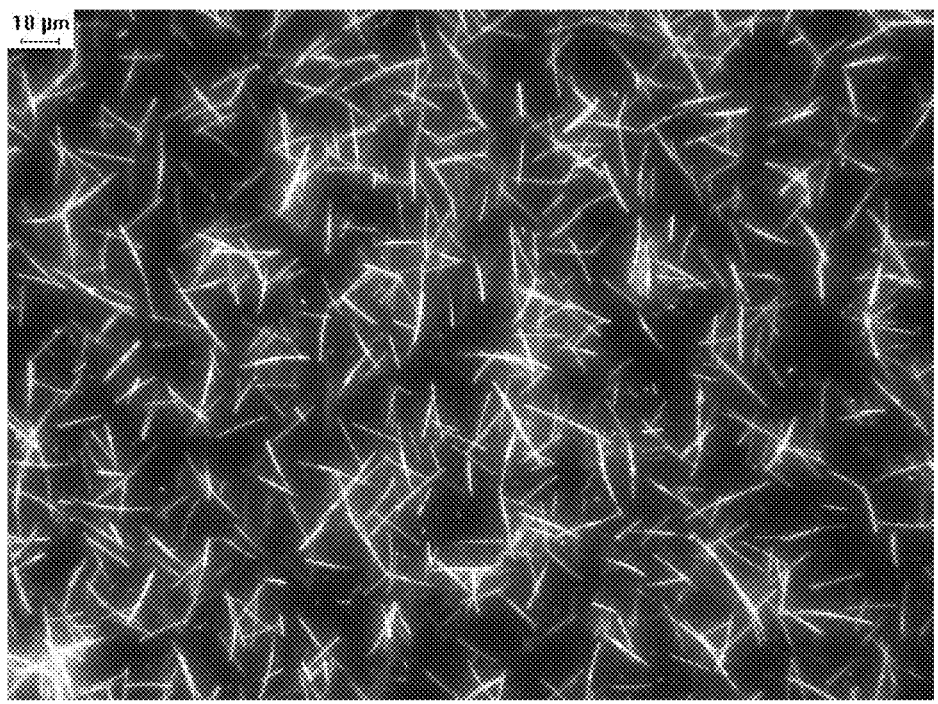
FIG. 11 shows an optical micrograph of the silver nanowire product of Example 13.
Figure 12:
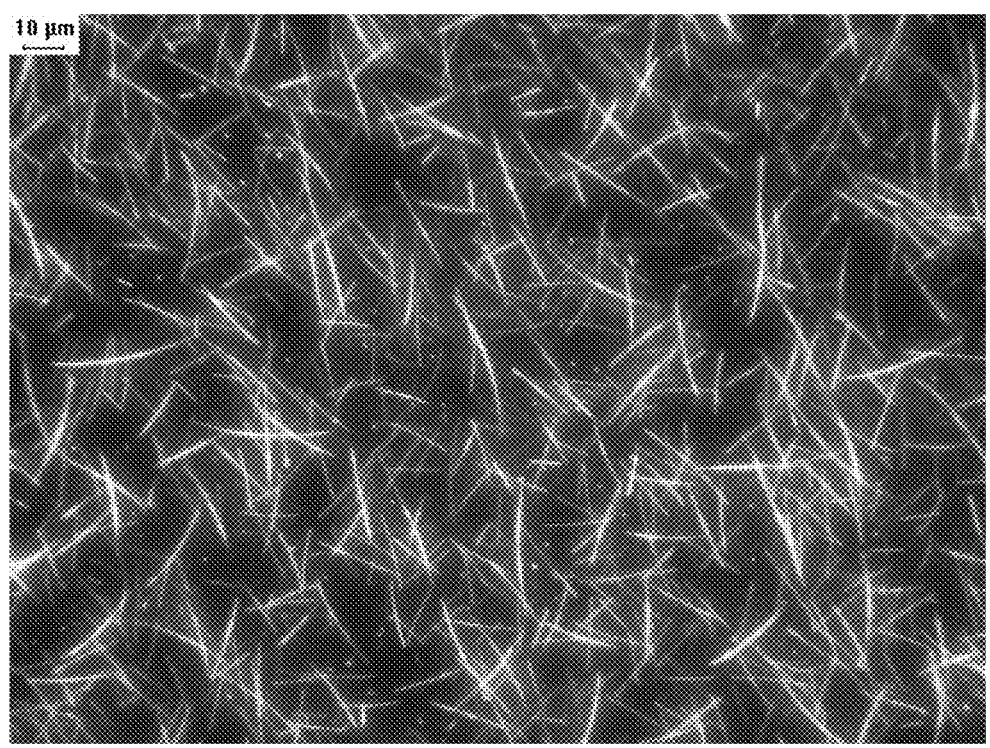
FIG. 12 shows an optical micrograph of the silver nanowire product of Example 13.

FIGS. 11 and 12 show optical micrographs of the silver nanowire product, which had an average diameter of 67.8±11.1 nm and an average nanowire length of 13.4±5.5 µm, based on measurement of at least 100 nanowires. There was very little non-nanowire content present.

Example 14

A 500 mL reaction flask containing 260 mL ethylene glycol (EG), 40 mL of 0.84 M polyvinylpyrrolidinone (PVP, 55,000 weight-average molecular weight) in EG, and 7.6 mg of erbium (III) chloride hexahydrate, was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. A stock solution of 0.50 M AgNO$_3$ in EG was also degassed with nitrogen, and then a 20 mL syringe of the degassed solution was prepared. The AgNO$_3$ solution was then added at a constant rate over 25 min via a 12 gauge TEFLON® fluoropolymer syringe needle. The flask was then held at temperature for 60 min, after which it was allowed to cool down to ambient temperature.

Figure 13:
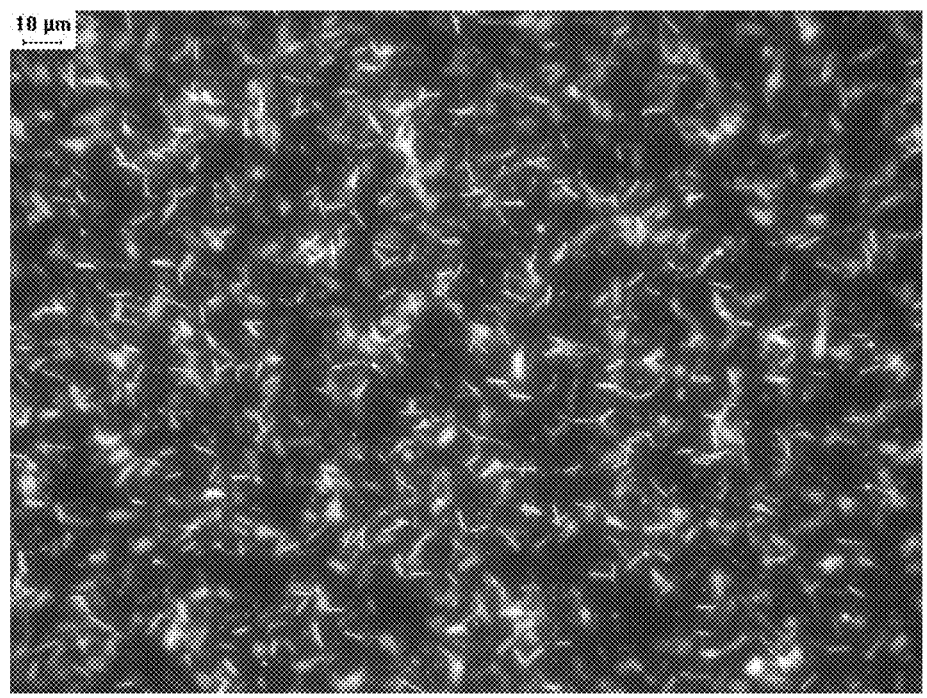
FIG. 13 shows an optical micrograph of the silver nanowire product of Example 14.
Figure 14:
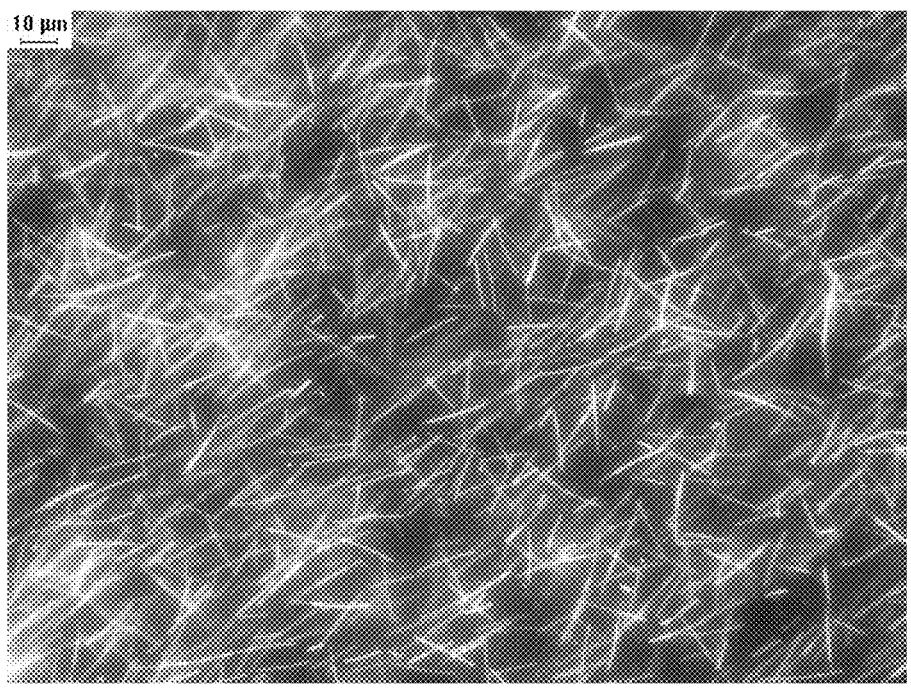
FIG. 14 shows an optical micrograph of the silver nanowire product of Example 14.

FIGS. 13 and 14 show optical micrographs of the silver nanowire product, which had an average diameter of 69.3±11.6 nm and an average nanowire length of 13.3±7.2 µm, based on measurement of at least 100 nanowires.

Example 15

A 500 mL reaction flask containing 260 mL ethylene glycol (EG), 40 mL of 0.84 M polyvinylpyrrolidinone (PVP, 55,000 weight-average molecular weight) in EG, and 8.8 mg of thulium (III) chloride hexahydrate, was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. A stock solution of 0.50 M AgNO$_3$ in EG was also degassed with nitrogen, and then a 20 mL syringe of the degassed solution was prepared. The AgNO$_3$ solution was then added at a constant rate over 50 min via a 12 gauge TEFLON® fluoropolymer syringe needle. The flask was then held at temperature for 90 min, after which it was allowed to cool down to ambient temperature.

Figure 15:
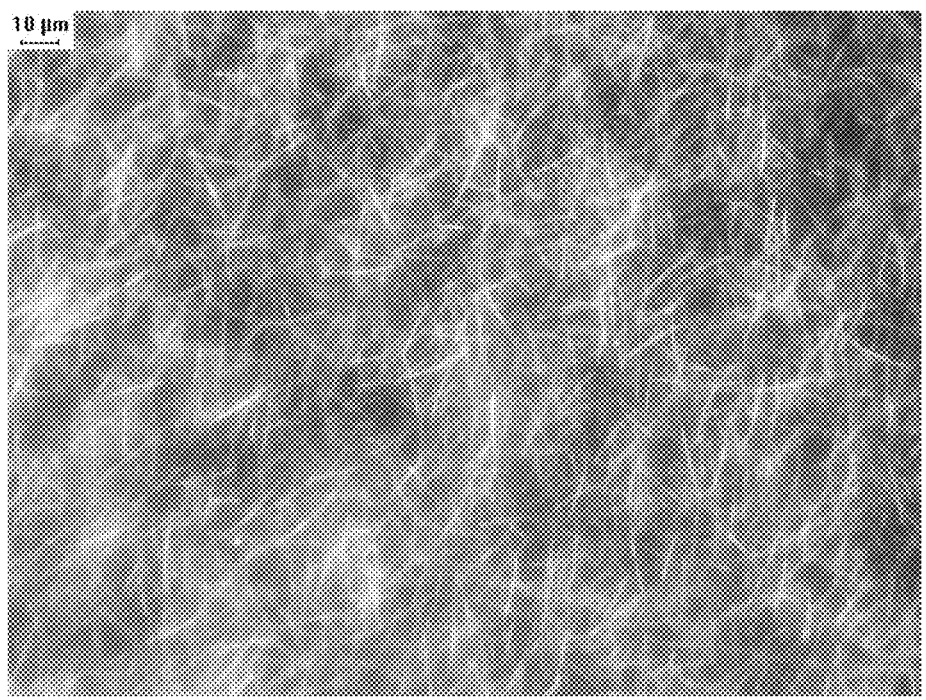
FIG. 15 shows an optical micrograph of the silver nanowire product of Example 15.
Figure 16:
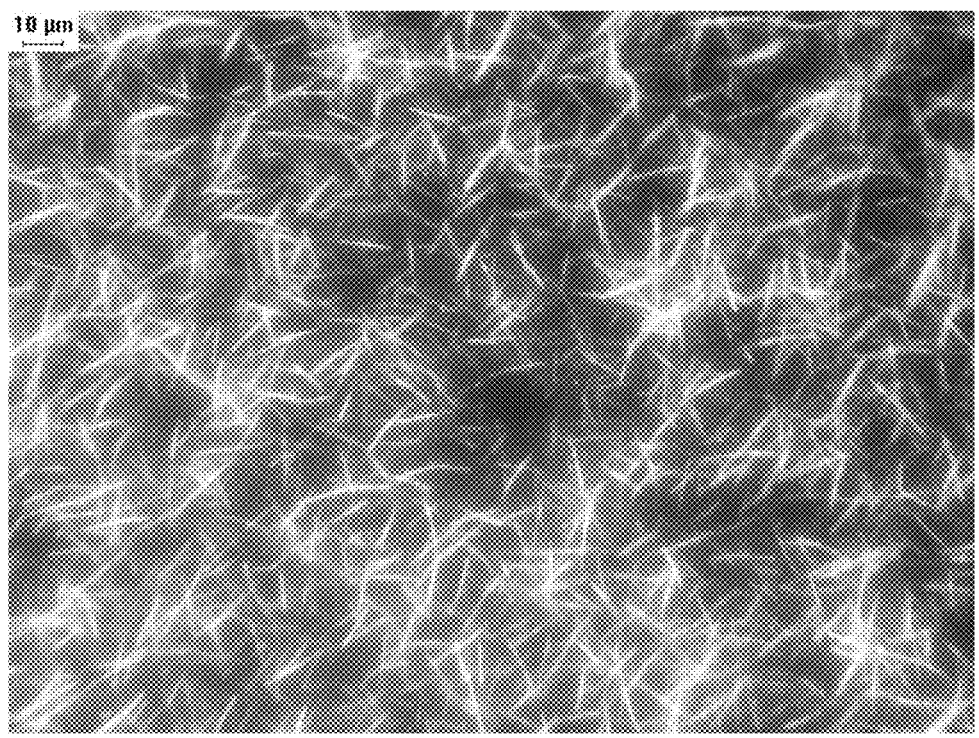
FIG. 16 shows an optical micrograph of the silver nanowire product of Example 15.

FIGS. 15 and 16 show optical micrographs of the silver nanowire product, which had an average diameter of 67.3±12.0 nm and an average nanowire length of 17.4±6.2 µm, based on measurement of at least 100 nanowires. There was very little non-nanowire content present.

Example 16

A 500 mL reaction flask containing 240 mL ethylene glycol (EG) and 12.1 mg of europium (III) chloride hexahydrate was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.25 M AgNO$_3$ in EG and 0.84 M polyvinylpyrrolidinone (PVP, 55,000 weight-average molecular weight) in EG were also degassed with nitrogen, then 40 mL syringes of each were prepared. The AgNO$_3$ and PVP solutions were then added at a constant rate over 50 min via a 12 gauge a TEFLON® fluoropolymer syringe needle. The flask was then held at temperature for 60 min, after which it was allowed to cool down to ambient temperature.

Figure 17:
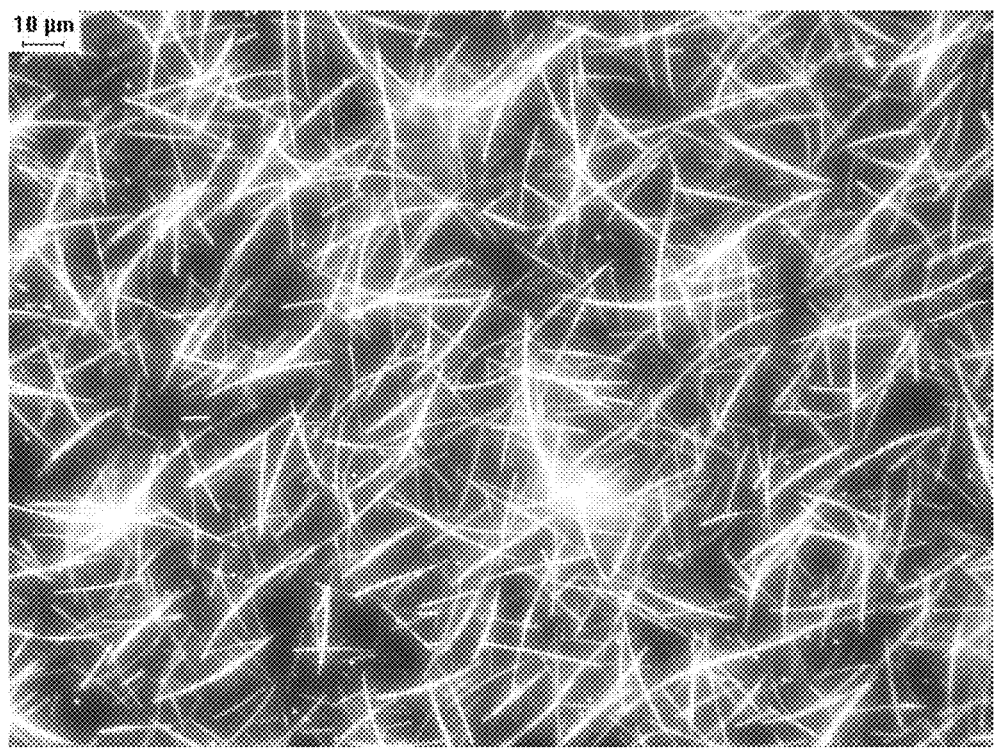
FIG. 17 shows an optical micrograph of the silver nanowire product of Example 16.

FIG. 17 shows an optical micrograph of the silver nanowire product, which had an average nanowire diameter of 74.0±17.6 nm and an average nanowire length of 15.9±7.7 µm, where the indicated average diameter, average length, and their standard deviations were calculated from measurements of at least 100 wires.

Example 17

A 500 mL reaction flask containing 240 mL ethylene glycol (EG) and 12.8 mg of europium (III) chloride hexahydrate was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 125° C. Stock solutions of 0.25 M AgNO$_3$ in EG and 0.84 M polyvinylpyrrolidinone (PVP, 55,000 weight-average molecular weight) in EG were also degassed with nitrogen, then 40 mL syringes of each were prepared. The AgNO$_3$ and PVP solutions were then added at a constant rate over 50 min via a 12 gauge a TEFLON® fluoropolymer syringe needle. The flask was then held at temperature for 180 min, after which it was allowed to cool down to ambient temperature.

Figure 18:
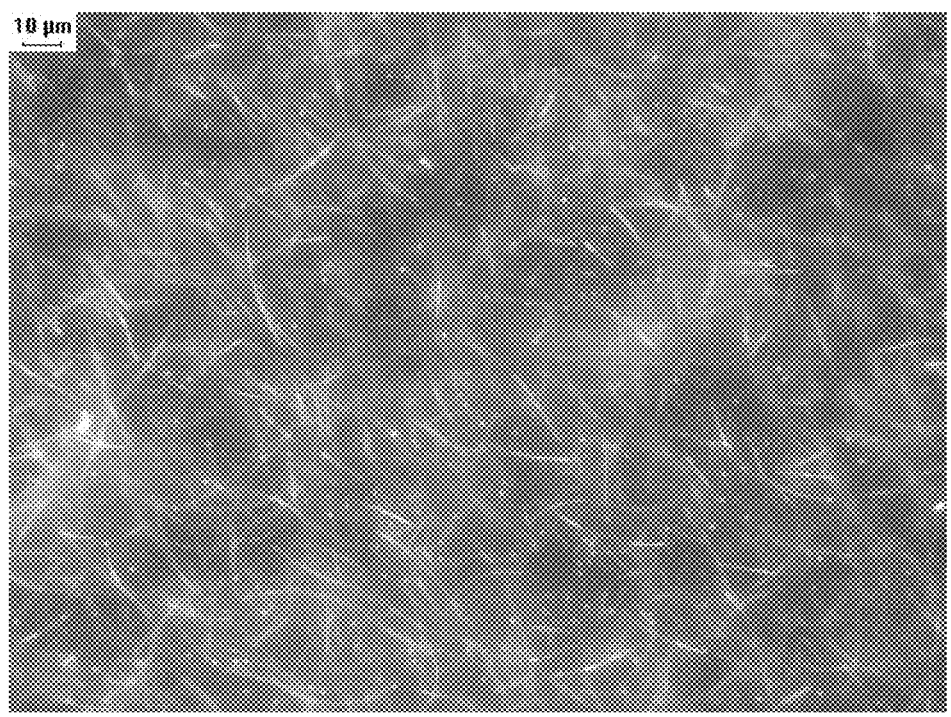
FIG. 18 shows an optical micrograph of the silver nanowire product of Example 17.

FIG. 18 shows an optical micrograph of the silver nanowire product, which had an average nanowire diameter of 63.3±15.7 nm and an average nanowire length of 19.2±14.9 µm.

Example 18

A 500 mL reaction flask containing 280 mL ethylene glycol (EG), 6.1 mg of dysprosium (III) nitrate hexahydrate, and 1.7 g of 27 mM NaCl in EG was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.50 M AgNO$_3$ in EG and 0.84 M polyvinylpyrrolidinone (PVP, 55,000 weight-average molecular weight) in EG were also degassed with nitrogen, then 20 mL syringes of each were prepared. The AgNO$_3$ and PVP solutions were then added at a constant rate over 25 min via 12 gauge TEFLON® fluoropolymer syringe needles. The flask was then held at temperature for 60 min, after which it was allowed to cool down to ambient temperature.

Figure 19:
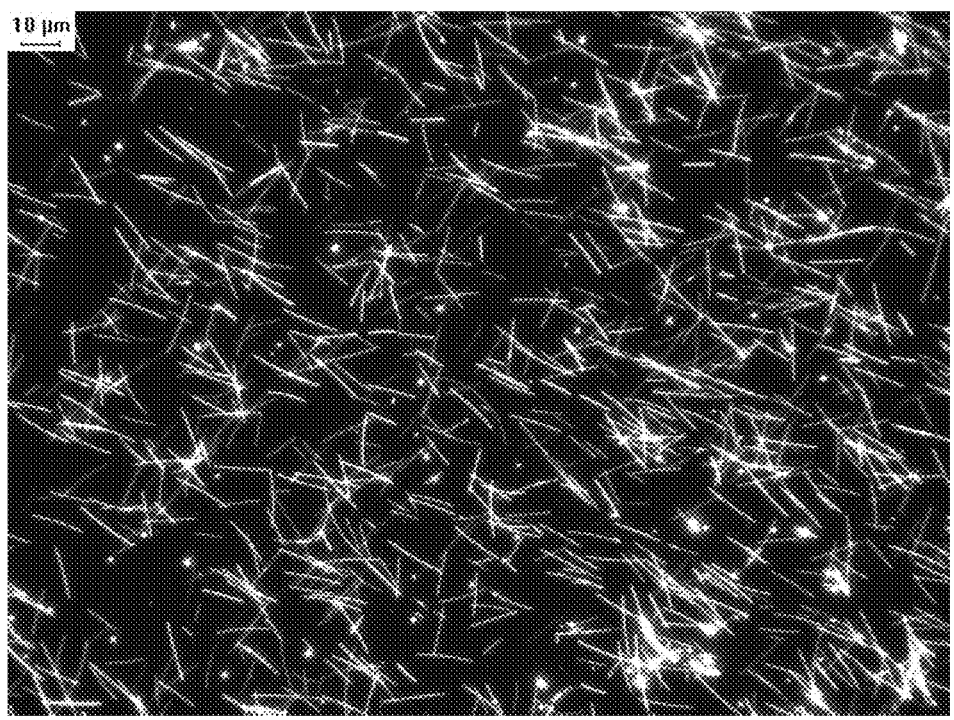
FIG. 19 shows an optical micrograph of the silver nanowire product of Example 18.
Figure 20:
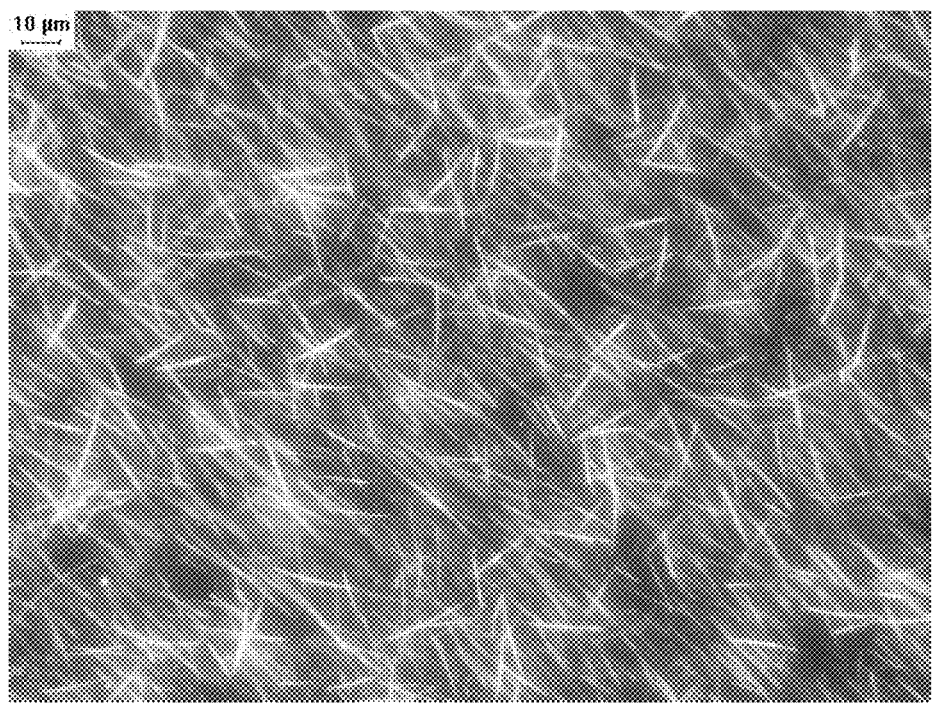
FIG. 20 shows a scanning electron micrograph of the silver nanowire product of Example 18.

FIG. 19 shows an optical micrograph of the silver nanowire product and FIG. 20 shows a scanning electron micrograph of the silver nanowire product. Little to no non-nanowire content was visible.

Figure 21:
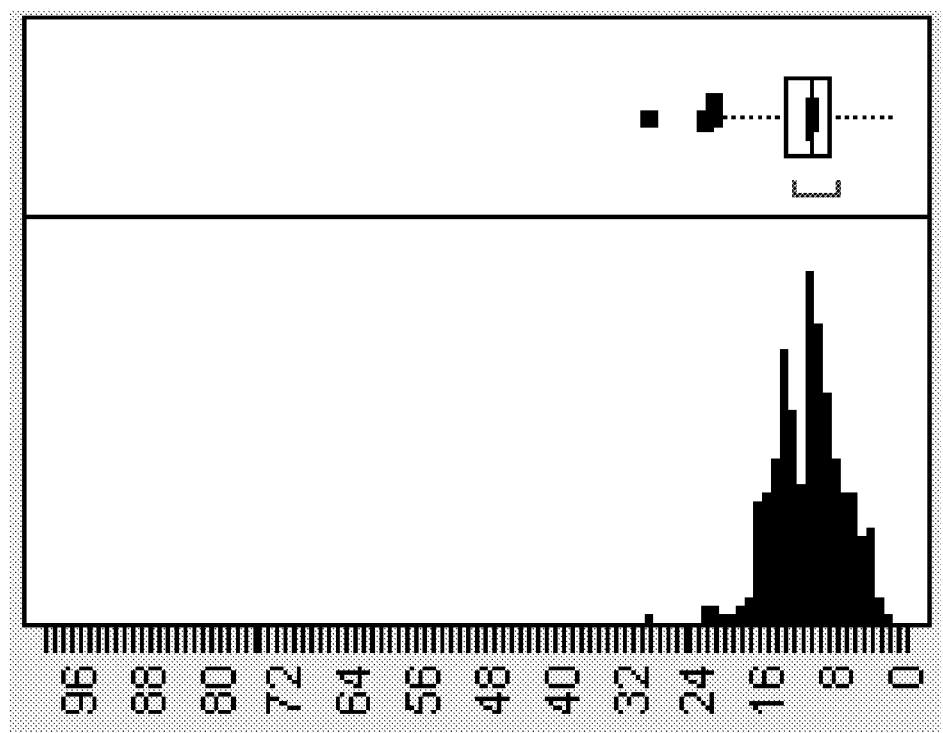
FIG. 21 shows the length distribution of the silver nanowire product of Example 18.

FIG. 21 shows the very narrow length distribution of a 100 nanowire random sample taken from the silver nanowire product. The nanowires had an average diameter of 67.2±12.0 nm and an average nanowire length of 11.2±4.1 µm.

Example 19

A 500 mL reaction flask containing 240 mL ethylene glycol (EG) and 11.7 mg of gadolinium (III) chloride hexahydrate was degas sed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.25 M $AgNO_3$ in EG and 0.84 M polyvinylpyrrolidinone (PVP, 55,000 weight-average molecular weight) in EG were also degassed with nitrogen, then 40 mL syringes of each were prepared. The $AgNO_3$ and PVP solutions were then added at a constant rate over 25 min via 12 gauge TEFLON® fluoropolymer syringe needles. The flask was then held at temperature for 90 min, after which it was allowed to cool down to ambient temperature.

Figure 22:
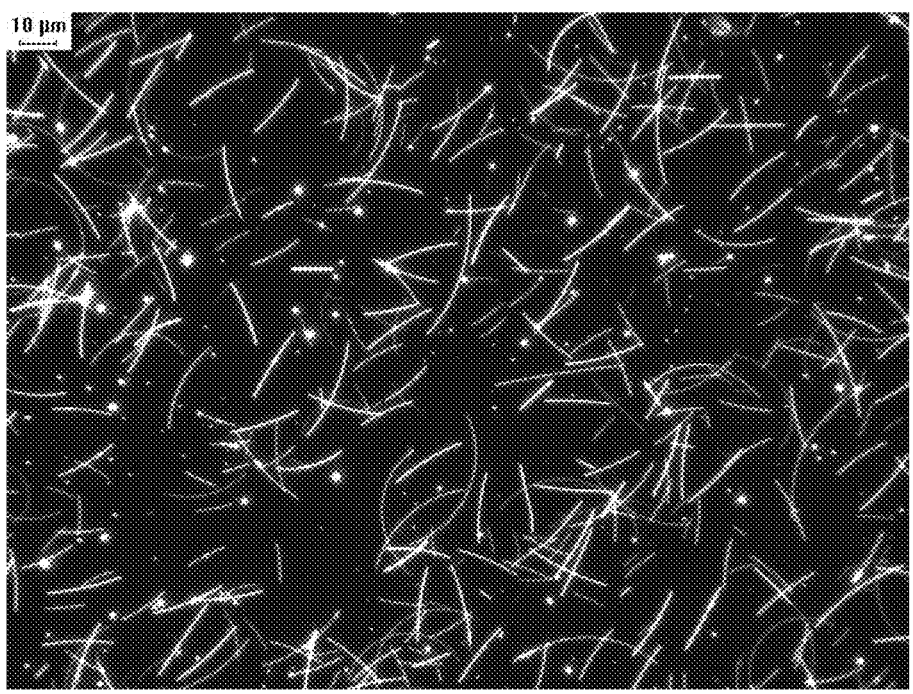
FIG. 22 shows an optical micrograph of the silver nanowire product of Example 19.
Figure 23:
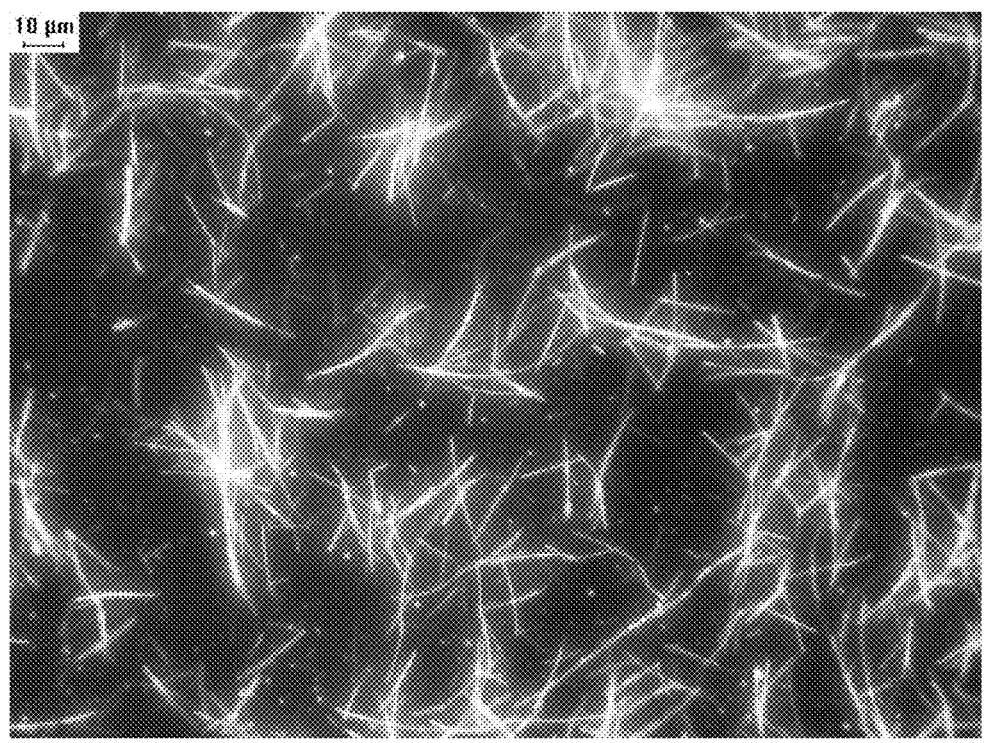
FIG. 23 shows an optical micrograph of the silver nanowire product of Example 19.

FIGS. 22 and 23 show optical micrograph of the silver nanowire product, which had an average nanowire diameter of 70.6±13.9 nm and an average nanowire length of 18.2±11.7 μm, where the indicated average diameter, average length, and their standard deviations were calculated from measurements of at least 100 wires.

Example 20

The procedure of Example 19 was repeated, using 20.5 mg of gadolinium (III) chloride hexahydrate and 40 mL of 0.50 M $AgNO_3$.

Figure 24:
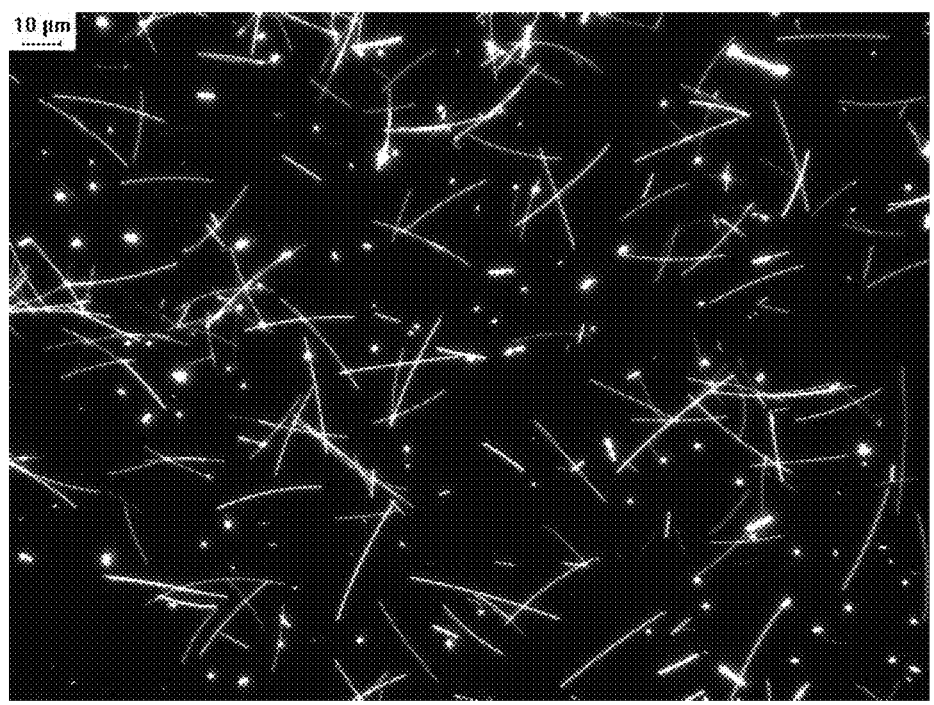
FIG. 24 shows an optical micrograph of the silver nanowire product of Example 20.
Figure 25:
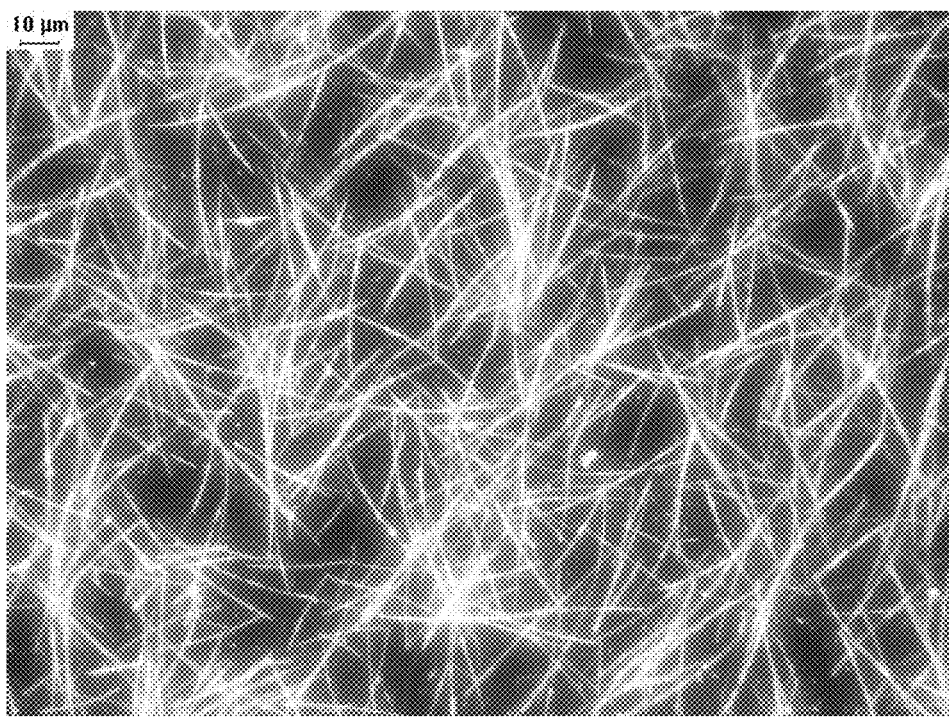
FIG. 25 shows an optical micrograph of the silver nanowire product of Example 20.

FIGS. 24 and 25 show optical micrograph of the silver nanowire product, which had an average nanowire diameter of 94.0±21.1 nm and an average nanowire length of 17.2±11.0 μm, where the indicated average diameter, average length, and their standard deviations were calculated from measurements of at least 100 wires.

Example 21

A 500 mL reaction flask containing 280 mL ethylene glycol (EG), 12.7 mg of terbium (III) nitrate hexahydrate, and 2.8 g of 28 mM NaCl in EG was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.50 M $AgNO_3$ in EG and 0.84 M polyvinylpyrrolidinone (PVP, 55,000 weight-average molecular weight) in EG were also degas sed with nitrogen, then 20 mL syringes of each were prepared. The $AgNO_3$ and PVP solutions were then added at a constant rate over 25 min via 12 gauge TEFLON® fluoropolymer syringe needles. The flask was then held at temperature for 60 min, after which it was allowed to cool down to ambient temperature.

Figure 26:
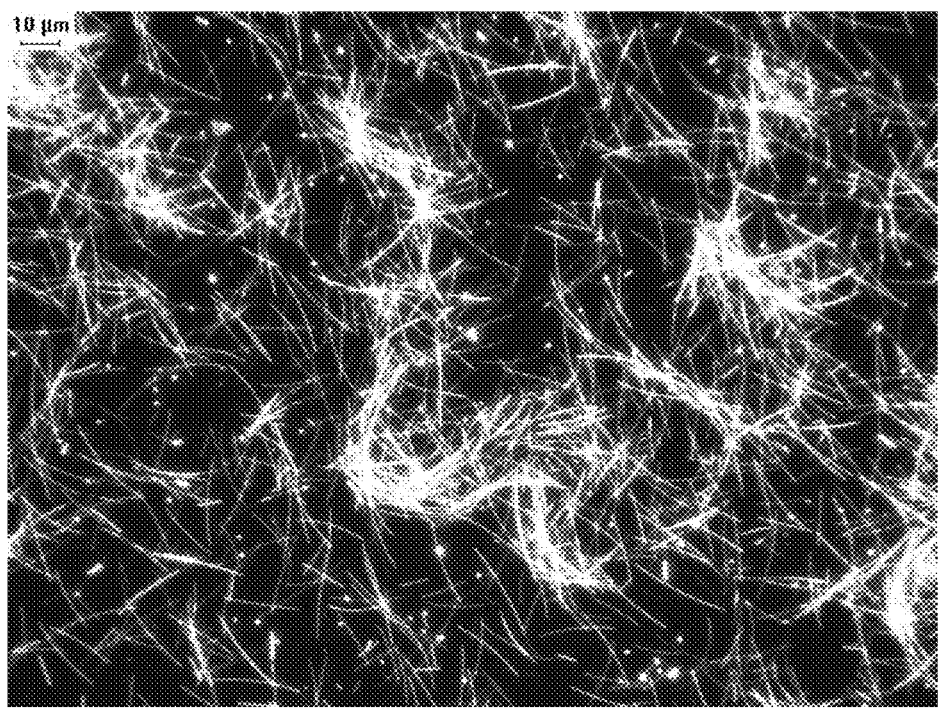
FIG. 26 shows an optical micrograph of the silver nanowire product of Example 21.

FIG. 26 shows an optical micrograph of the silver nanowire product, which had an average nanowire diameter of 61.4±10.7 nm and an average nanowire length of 16.5±6.9 μm, where the indicated average diameter, average length, and their standard deviations were calculated from measurements of at least 100 wires.

Example 22

A 500 mL reaction flask containing 280 mL ethylene glycol (EG), 5.8 mg of holmium (III) nitrate pentahydrate, and 1.6 g of 27 mM NaCl in EG was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.50 M $AgNO_3$ in EG and 0.84 M polyvinylpyrrolidinone (PVP, 55,000 weight-average molecular weight) in EG were also degas sed with nitrogen, then 20 mL syringes of each were prepared. The $AgNO_3$ and PVP solutions were then added at a constant rate over 25 min via 12 gauge TEFLON® fluoropolymer syringe needles. The flask was then held at temperature for 60 min, after which it was allowed to cool down to ambient temperature.

Figure 27:
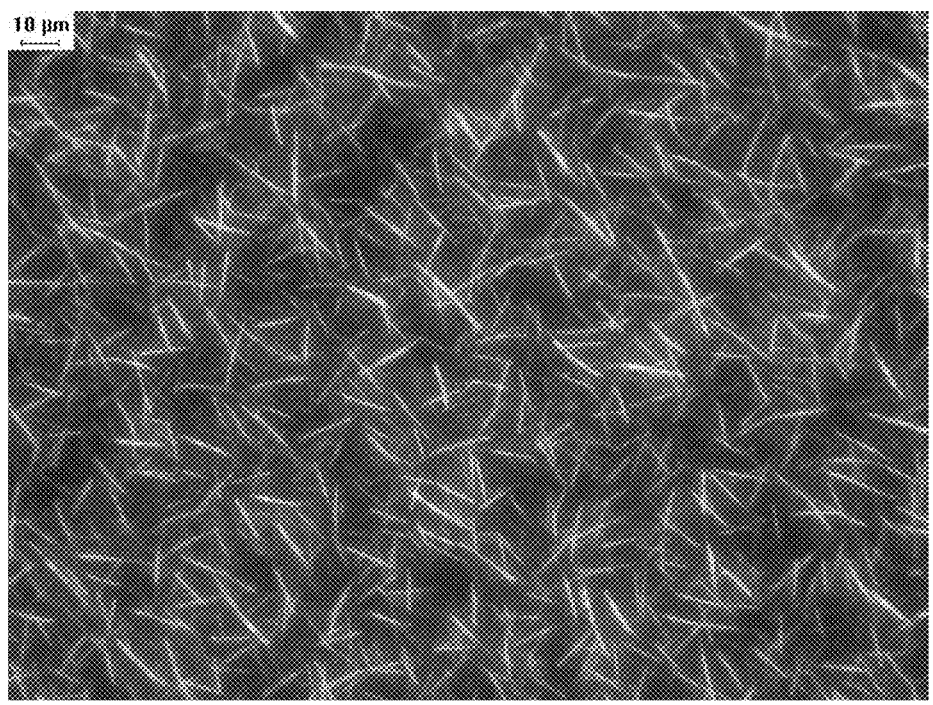
FIG. 27 shows an optical micrograph of the silver nanowire product of Example 22.

FIG. 27 shows an optical micrograph of the silver nanowire product, which had an average diameter of 65.2±11.0 nm and an average nanowire length of 9.6±3.3 μm, based on measurement of at least 100 nanowires. There was very little non-nanowire content present.

Example 23

A 500 mL reaction flask containing 300 mL ethylene glycol (EG), 2.21 g polyvinylpyrrolidinone (PVP, 55,000 weight-average molecular weight), and 8.8 mg of ytterbium (III) chloride hexahydrate, was degas sed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. A stock solution of 0.50 M $AgNO_3$ in EG was also degassed with nitrogen, and then a 20 mL syringe of the degassed solution was prepared. The $AgNO_3$ solution was then added at a constant rate over 25 min via a 12 gauge TEFLON® fluoropolymer syringe needle. The flask was then held at temperature for 60 min, after which it was allowed to cool down to ambient temperature. A first sample of the unpurified product was taken for optical microscopy. The silver nanowire product was then purified by washing with 400 mL acetone, centrifuging at 300 G for 30 min, washing with 200 mL isopropanol, and then centrifuging again at 300 G for 30 min. A second sample of the purified product was taken for optical microscopy.

Figure 28:
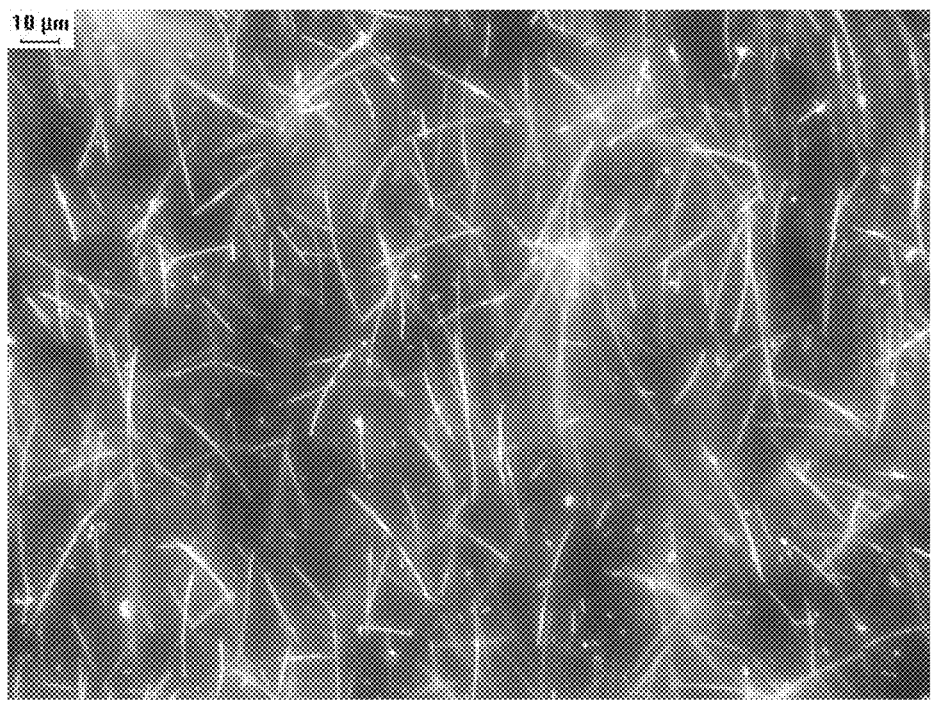
FIG. 28 shows an optical micrograph of the silver nanowire product of Example 23.
Figure 29:
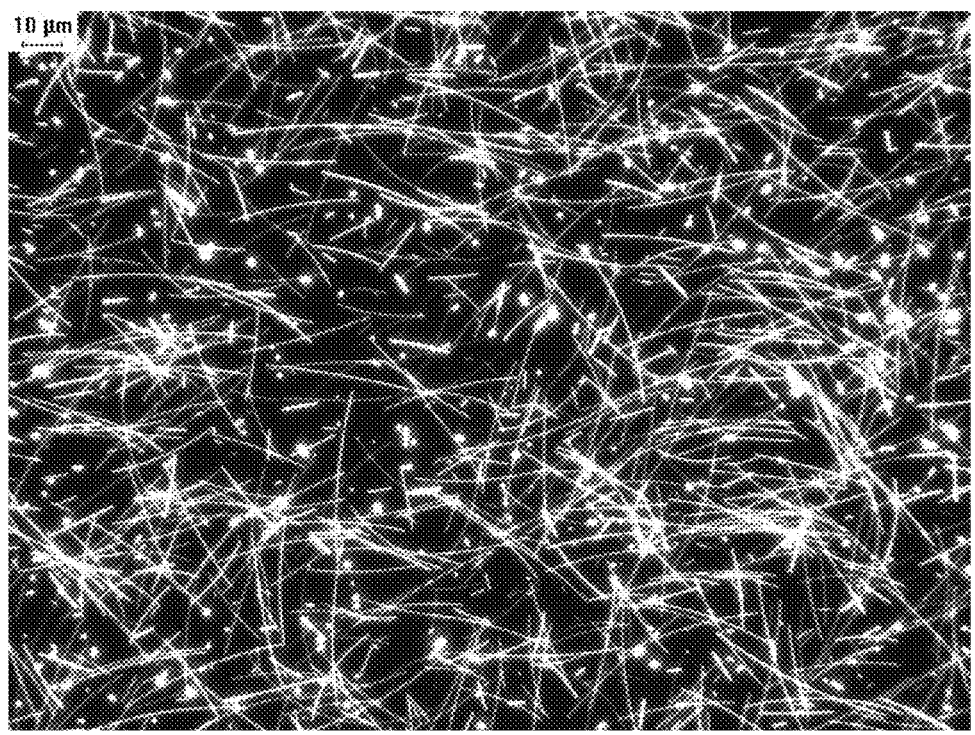
FIG. 29 shows an optical micrograph of the silver nanowire product of Example 23.

FIGS. 28 and 29 show optical micrographs of the unpurified and purified silver nanowire product, which had an average diameter of 94.3±21.0 nm and an average length of 20.6±13.4 μm, based on measurement of 100 wires.

Example 24

A 500 mL reaction flask containing 280 mL ethylene glycol (EG), 1.7 g polyvinylpyrrolidinone (PVP, 55,000 weight-average molecular weight), and 9.2 mg of ytterbium (III) chloride hexahydrate, was degas sed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. Stock solutions of 0.50 M $AgNO_3$ in EG and 0.84 M PVP in EG were also degas sed with nitrogen, and then 20 mL syringes of each degassed solution was prepared. The $AgNO_3$ and PVP solutions were then added at a constant rate over 25 min via 12 gauge TEFLON® fluoropolymer syringe needles. The flask was then held at temperature for 60 min, after which it was allowed to cool down to ambient temperature. A first sample of the unpurified product was taken for optical microscopy. The silver nanowire product was then purified by washing with 400 mL acetone, centrifuging at 300 G for 30 min, washing with 200 mL isopropanol, and then centrifuging again at 300 G for 30 min. A second sample of the purified product was taken for optical microscopy.

Figure 30:
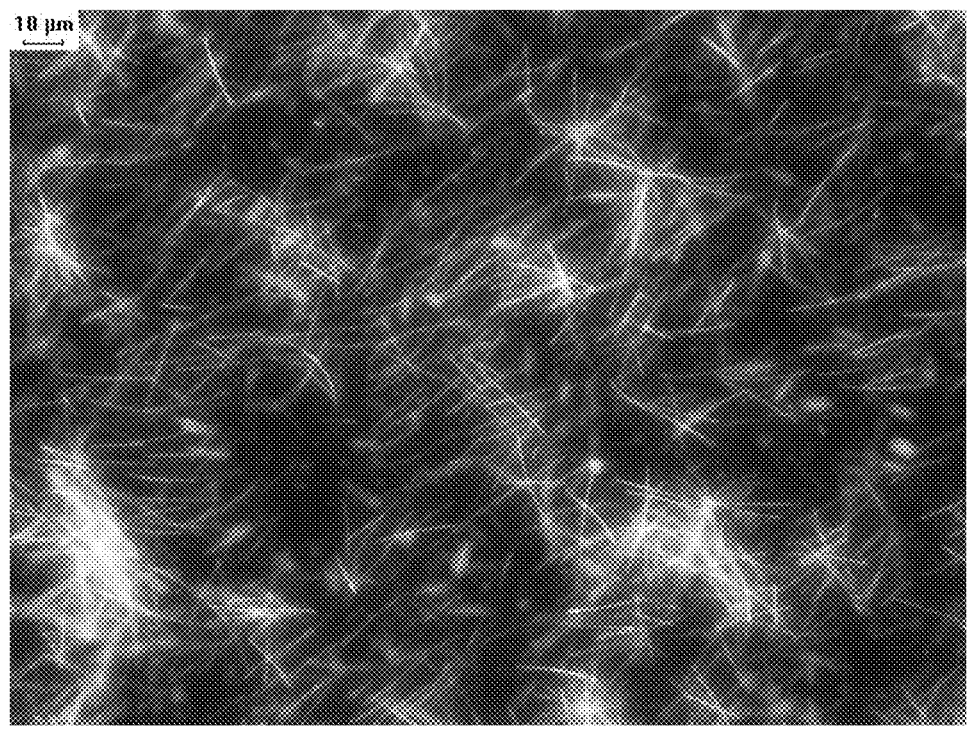
FIG. 30 shows an optical micrograph of the silver nanowire product of Example 24.
Figure 31:
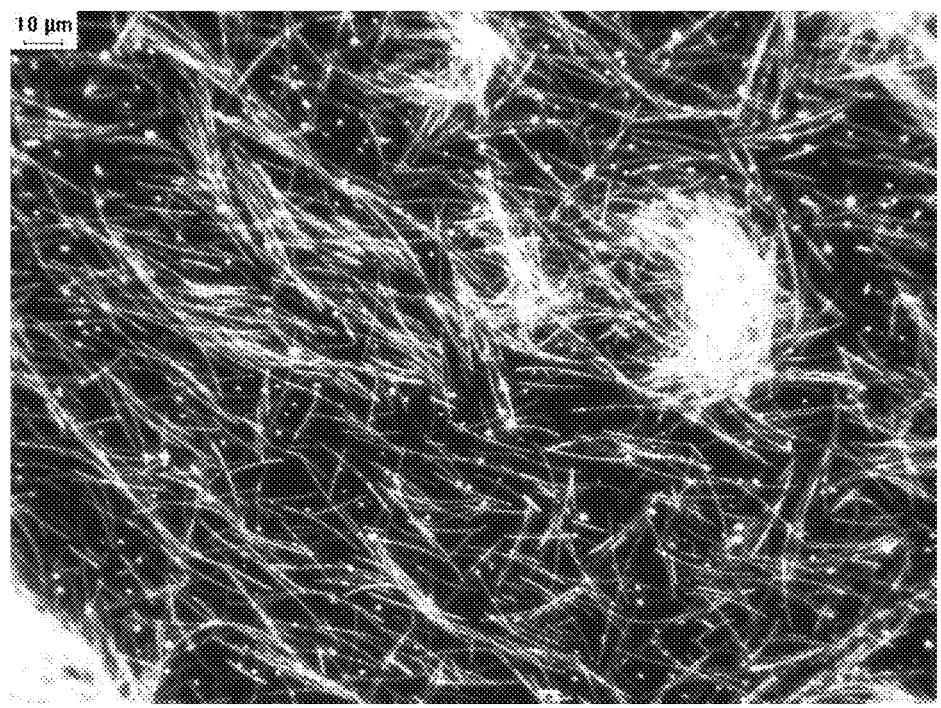
FIG. 31 shows an optical micrograph of the silver nanowire product of Example 24.

FIGS. 30 and 31 show optical micrographs of the unpurified and purified silver nanowire product, which had an average diameter of 72.7±14.5 nm and an average length of 22.6±7.4 μm, based on measurement of 100 wires.

Example 25

A 500 mL reaction flask containing 280 mL ethylene glycol (EG) and 19.1 mg of neodymium (III) chloride hexahydrate was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.25 M $AgNO_3$ in EG and 0.84 M polyvinylpyrrolidinone (PVP, 55,000 weight-average molecular weight) in EG were also degassed with nitrogen, then 20 mL syringes of each were prepared. The $AgNO_3$ and PVP solutions were then added at a constant rate over 25 min via a 12 gauge a TEFLON® fluoropolymer syringe needle. The flask was then held at temperature for 60 min, after which it was allowed to cool down to ambient temperature.

Figure 32:
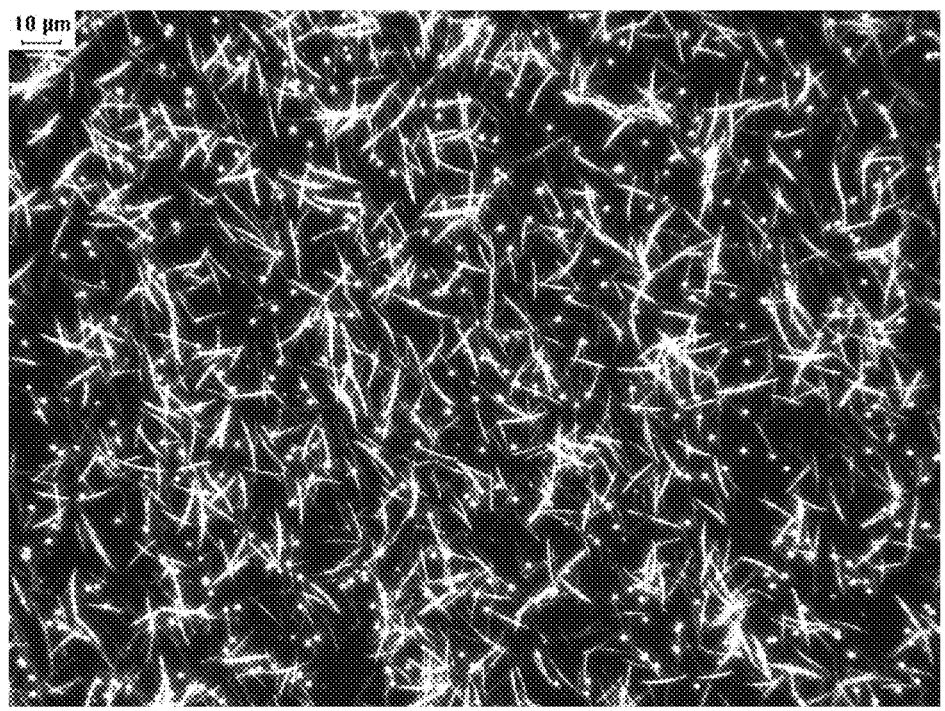
FIG. 32 shows an optical micrograph of the silver nanowire product of Example 25.

FIG. 32 shows an optical micrograph of the silver nanowire product, which had an average nanowire diameter of 54.1±14.4 nm and an average nanowire length of 8.3±4.2 μm, where the indicated average diameter, average length, and their standard deviations were calculated from measurements of at least 100 wires.

Example 26

A 500 mL reaction flask containing 240 mL ethylene glycol (EG) and 10.7 mg of neodymium (III) chloride hexahydrate was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the flask was then heated to 145° C. Stock solutions of 0.25 M $AgNO_3$ in EG and 0.84 M polyvinylpyrrolidinone (PVP, 55,000 weight-average molecular weight) in EG were also degassed with nitrogen, then 40 mL syringes of each were prepared. The $AgNO_3$ and PVP solutions were then added at a constant rate over 50 min via a 12 gauge a TEFLON® fluoropolymer syringe needle. The flask was then held at temperature for 60 min, after which it was allowed to cool down to ambient temperature.

Figure 33:
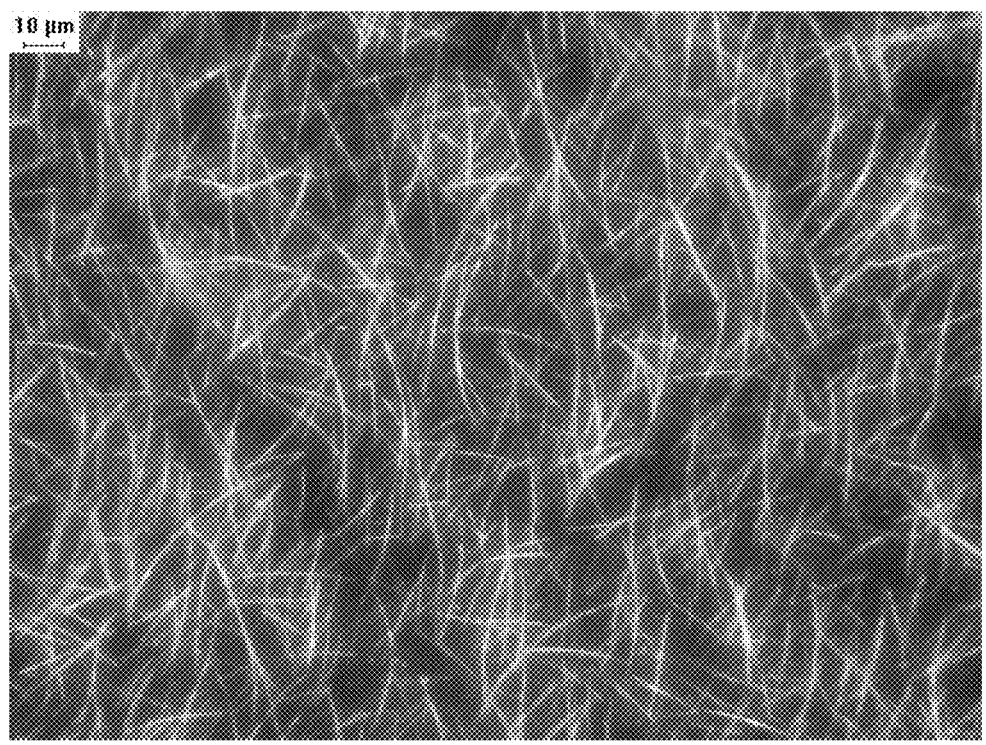
FIG. 33 shows an optical micrograph of the silver nanowire product of Example 26.

FIG. 33 shows an optical micrograph of the silver nanowire product, which had an average nanowire diameter of 66.9±17.0 nm and an average nanowire length of 15.3±7.8 μm.

Example 27

A 500 mL reaction flask containing 300 mL ethylene glycol (EG), 2.2 g polyvinylpyrrolidinone (PVP, 55,000 weight-average molecular weight), and 6.3 mg of lutetium (III) chloride hexahydrate, was degassed overnight at room temperature using nitrogen that was introduced below the liquid surface through a TEFLON® fluoropolymer tube. The tube was then retracted from the liquid to provide nitrogen blanketing of the reaction flask headspace at approximately 0.5 L/min, after which the agitated flask was then heated to 145° C. A stock solution of 0.50 M $AgNO_3$ in EG was also degassed with nitrogen, and then a 20 mL syringe of the degassed solution was prepared. The $AgNO_3$ solution was then added at a constant rate over 25 min via a 12 gauge TEFLON® fluoropolymer syringe needle. The flask was then held at temperature for 60 min, after which it was allowed to cool down to ambient temperature. A first sample of the unpurified product was taken for optical microscopy. The silver nanowire product was then purified by washing with 400 mL acetone, centrifuging at 300 G for 30 min, washing with 200 mL isopropanol, and then centrifuging again at 300 G for 30 min. A second sample of the purified product was taken for optical microscopy.

Figure 34:
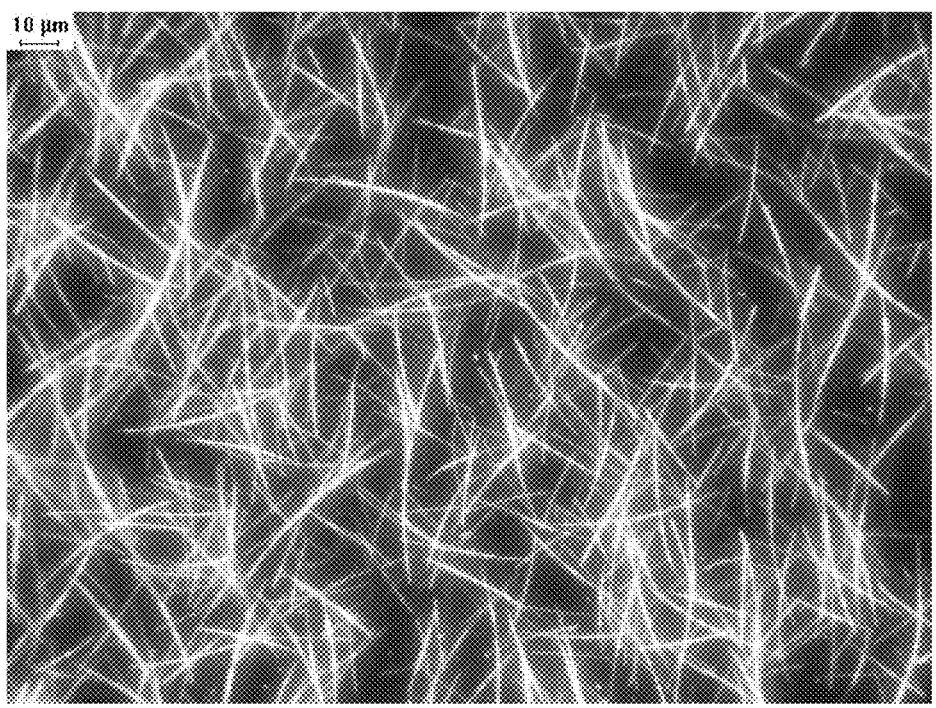
FIG. 34 shows an optical micrograph of the unpurified silver nanowire product of Example 27.
Figure 35:
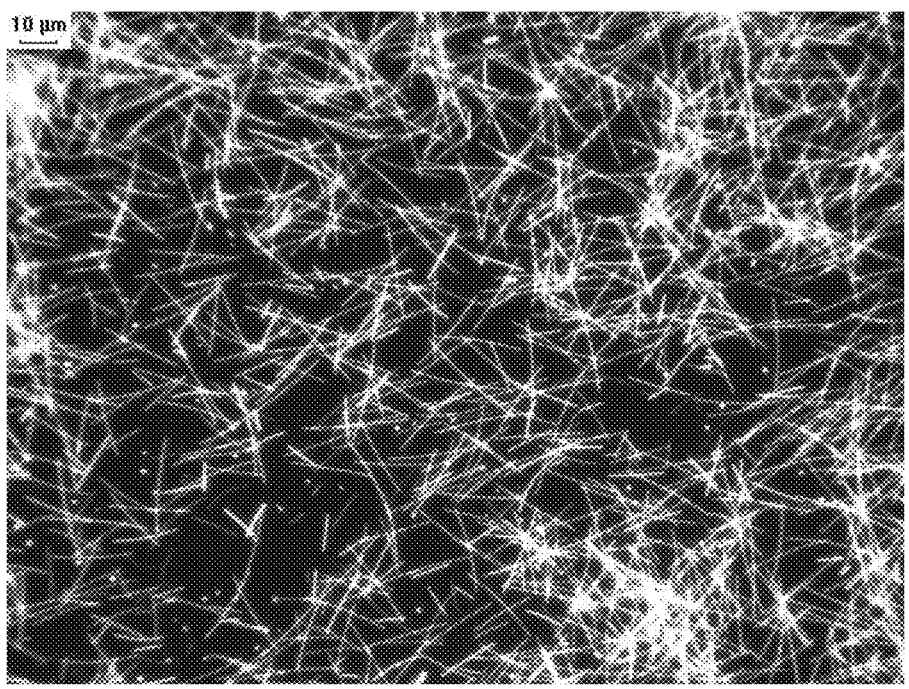
FIG. 35 shows an optical micrograph of the purified silver nanowire product of Example 27.

FIGS. 34 and 35 show optical micrographs of the unpurified and purified silver nanowire product, which had an average diameter of 84.2±16.3 nm and an average length of 18.5±9.9 μm, based on measurement of 100 wires.

Example 28

Figure 36:
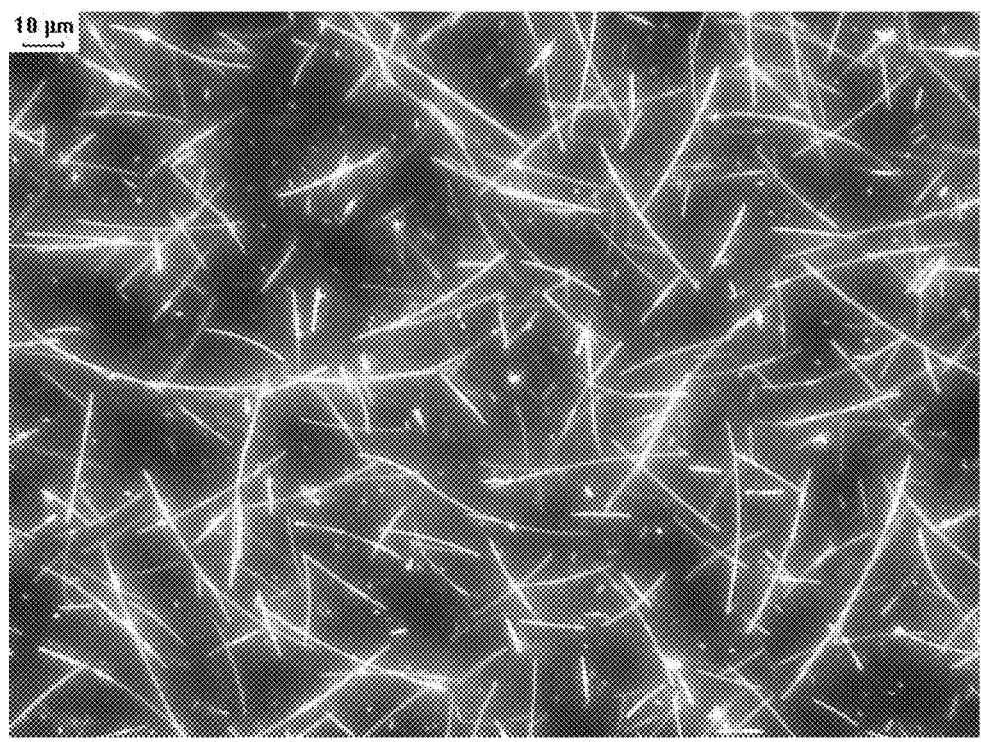
FIG. 36 shows an optical micrograph of the unpurified silver nanowire product of Example 28.

The procedure of Example 27 was repeated using 7.2 mg of lutetium (III) chloride hexahydrate. FIG. 36 shows an optical micrograph of the unpurified silver nanowire product, which had an average diameter of 114±56.0 nm and an average length of 15.6±12.3 μm, based on measurement of 100 wires.

Example 29

Comparative

To a 500 mL reaction flask was added 280 mL ethylene glycol (EG), 0.16 g of a 7.0 mM solution of $CuCl_2$ in EG and 0.50 g of a 2.9 mM solution of Cu(acetylactonate)$_2$ in EG. The mixture was degassed with $N_2$ using a glass pipette for 2 hours. Two 20 mL syringes were prepared, the first with a 0.25 M degassed solution of $AgNO_3$ in EG, and the second with a 0.84 M degassed solution of polyvinylpyrrolidinone (PVP) in EG. The reaction mixture was heated to 145-148° C. and, after the reaction was held 10 minutes at the set point temperature, the $AgNO_3$ and PVP solutions were simultaneously added at a constant rate over 25 minutes via a 12 gauge TEFLON® fluoropolymer syringe needle.

The reaction $N_2$/NO (headspace) exhaust was filtered, passed through a $CO_2$ cold-trap, and was analyzed using a MINIRAE® 2000 volatile organic compound monitor (RAE Systems, San Jose, Calif.), which was equipped with a photoionization detector, using a 30 second data collection rate. NO sampling began at the start of the $AgNO_3$/PVP addition and continued for 1 hour after heat was removed from the reaction (ambient cool-down).

Figure 37:
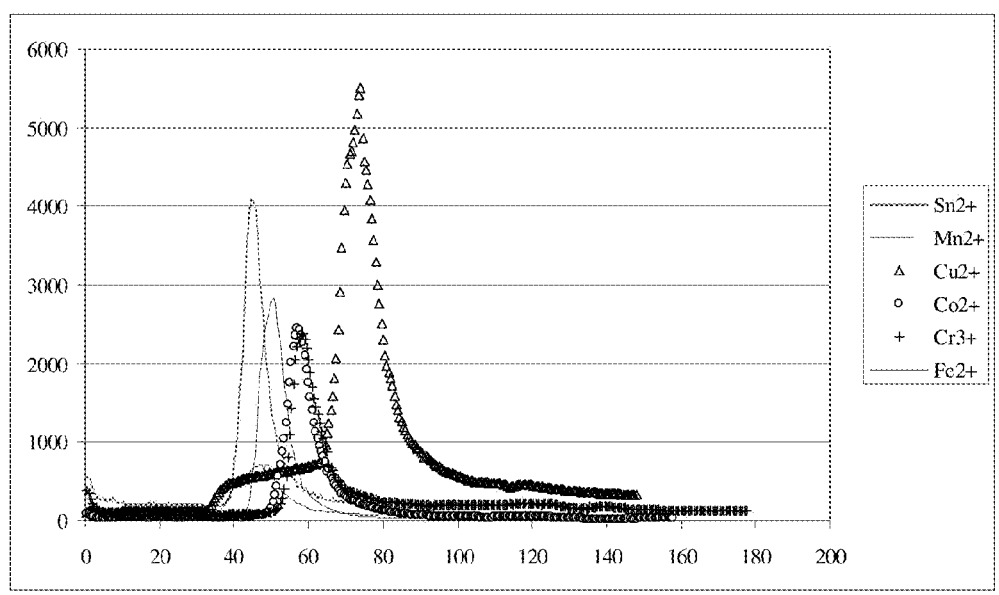
FIG. 37 shows the time evolution of nitric oxide detected in the headspace of the reaction media of comparative Examples 29-34.

The detected NO evolved during synthesis is plotted versus time in FIG. 37, which has a peak at approximately 20 min. The peak NO detected exceeded about 5500 ppm.

Example 30

Comparative

The procedure of Example 29 was repeated, using 1.25 g of a 7.7 mM solution of $FeCl_2$ in EG in place of the $CuCl_2$ and Cu(acetylacetonate)$_2$ solutions.

The detected NO evolved during synthesis is plotted versus time in FIG. 37, which has a peak at approximately 45 min. The peak NO detected exceeded about 700 ppm.

Example 31

Comparative

Silver nanowires were prepared using a silver-seeded process similar to that disclosed in U.S. patent application Ser. No. 13/205,080, filed Aug. 8, 2011, entitled NANOWIRE PREPARATION METHODS, COMPOSITIONS, AND ARTICLES, which is hereby incorporated by reference in its entirety.

The procedure was similar to that of Example 29, with the following exceptions. 0.85 g of a solution consisting of 1.88 mg SnCl$_2$ per gram of ethylene glycol (EG) was used in place of the CuCl$_2$ and Cu(acetylacetonate)$_2$ solutions. Prior to the addition of the AgNO$_3$ and PVP solutions, 3.2 g of a silver seed solution was added to the reaction mixture.

The headspace was analyzed according to the method of Example 29. The detected NO evolved during synthesis is plotted versus time in FIG. 37, which has a peak at approximately 45 min. The peak NO detected exceeded about 4000 ppm.

Example 32

Comparative

The procedure of Example 29 was repeated, using 1.2 g of a 7.3 mM solution of MnCl$_2$.4H$_2$O in EG in place of the CuCl$_2$ and Cu(acetylacetonate)$_2$ solutions.

The detected NO evolved during synthesis is plotted versus time in FIG. 37, which has a peak at approximately 50 min. The peak NO detected approached about 3000 ppm.

Example 3

Comparative

The procedure of Example 29 was repeated, using 1.1 g of a 7.4 mM solution of CoCl$_2$.4H$_2$O in EG in place of the CuCl$_2$ and Cu(acetylacetonate)$_2$ solutions.

The detected NO evolved during synthesis is plotted versus time in FIG. 37, which has a peak at approximately 55 min. The peak NO detected exceeded about 2400 ppm.

Example 34

Comparative

The procedure of Example 29 was repeated, using 1.0 g of a 7.8 mM solution of CrCl$_3$.6H$_2$O in EG in place of the CuCl$_2$ and Cu(acetylacetonate)$_2$ solutions.

The detected NO evolved during synthesis is plotted versus time in FIG. 37, which has a peak at approximately 60 min. The peak NO detected approached about 2400 ppm.

Example 35

To a 500 mL reaction flask was added 240 mL ethylene glycol (EG), 1.3 g of a freshly prepared 15 mM solution of SmCl$_3$.6H$_2$O in EG. The mixture was degassed overnight at room temperature using nitrogen that was introduced below the liquid surface through a TEFLON® fluoropolymer tube, which was then retracted to provide headspace blanketing. Two 40 mL syringes were prepared, the first with a 0.25 M degassed solution of AgNO$_3$ in EG, and the second with a 0.84 M degassed solution of polyvinylpyrrolidinone (PVP) in EG. The reaction mixture was heated to 145° C. and, after the reaction was held 10 minutes at the set point temperature, the AgNO$_3$ and PVP solutions were simultaneously added at a constant rate over 50 minutes via a 12 gauge TEFLON® fluoropolymer syringe needle. The reaction mixture was held at 145° C. for 60 min prior to cooling.

The reaction N$_2$/NO (headspace) exhaust was filtered, passed through a CO$_2$ cold-trap, and was analyzed using a MINIRAE® 2000 volatile organic compound monitor (RAE Systems, San Jose, Calif.), which was equipped with a photoionization detector, using a 30 second data collection rate. NO sampling began at the start of the AgNO$_3$/PVP addition and continued for 1 hour after heat was removed from the reaction (ambient cool-down).

Figure 38:
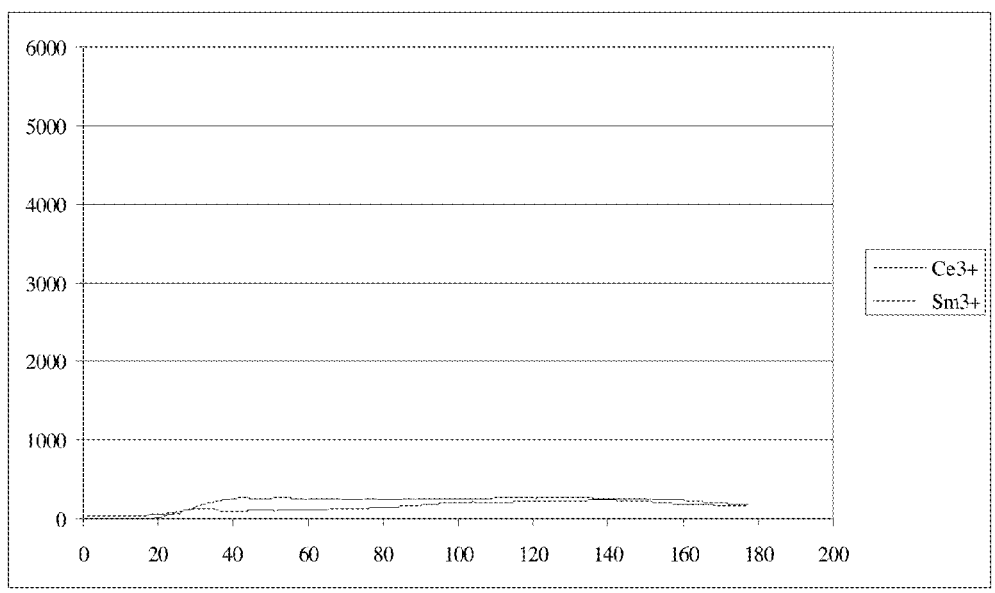
FIG. 38 shows the time evolution of nitric oxide detected in the headspace of the reaction media of Examples 35-36.

The detected NO evolved during synthesis is plotted versus time in FIG. 38. The peak NO detected did not exceed about 240 ppm.

Example 36

The procedure of Example 35 was repeated, using 5.5 g of a freshly prepared 9.0 mM solution of CeCl$_3$.7H$_2$O in EG in place of the SmCl$_3$.6H$_2$O. The detected NO evolved during synthesis is plotted versus time in FIG. 38. The peak NO detected did not exceed about 270 ppm.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced within.

What is claimed:
1. A method comprising:
providing at least one solution comprising at least one first reducible metal ion and at least one second metal or metal ion comprising at least one lanthanide metal or ion of a lanthanide, the at least one second metal or metal ion differing in atomic number from the at least one first reducible metal ion;
reducing the at least one first reducible metal ion to at least one first metal nanowire; and
further comprising co-producing nitric oxide at a ratio A of moles nitric oxide co-produced per mole of the at least one first reducible metal ion reduced,
wherein the ratio A is less than 40% of a ratio B, where B is the maximum instantaneous ratio of moles nitric oxide co-produced per mole of the at least one first reducible metal ion reduced when reducing the at least one first reducible metal ion in the presence of Fe$^{2+}$ ions.

2. The method according to claim 1, wherein the at least one first reducible metal ion comprises at least one ion of an element from International Union of Pure and Applied Chemistry (IUPAC) Group 11.

3. The method according to claim 1, wherein the at least one lanthanide metal or ion of a lanthanide comprises one or more of lanthanum, an ion of lanthanum, cerium, an ion of cerium, praseodymium, an ion of praseodymium, neodymium, an ion of neodymium, samarium, an ion of samarium, europium, an ion of europium, gadolinium, an ion of gadolinium, terbium, an ion of terbium, dysprosium, an ion of dysprosium, holmium, an ion of holmium, erbium, an ion of erbium, thulium, an ion of thulium, ytterbium, an ion of ytterbium, lutetium, or an ion of lutetium.

4. The method according to claim 2, wherein the at least one first reducible metal ion comprises at least one silver ion.

5. A method comprising:
providing at least one solution comprising at least one first reducible metal ion and at least one second metal or metal ion comprising at least one lanthanide metal or ion of a lanthanide, the at least one second metal or metal ion differing in atomic number from the at least one first reducible metal ion;
reducing the at least one first reducible metal ion to at least one first metal nanowire; and
further comprising co-producing nitric oxide at a ratio A of moles nitric oxide co-produced per mole of the at least one first reducible metal ion reduced,
wherein the ratio A is less than 15% of a ratio B', where B' is the maximum instantaneous ratio of moles nitric oxide co-produced per mole of the at least one first reducible metal ion reduced when reducing the at least one first reducible metal ion in the presence of $Cu^{2+}$ ions.

6. A method comprising:

providing at least one solution comprising at least one first reducible metal ion and at least one second metal or metal ion comprising at least one lanthanide metal or ion of a lanthanide, the at least one second metal or metal ion differing in atomic number from the at least one first reducible metal ion;

reducing the at least one first reducible metal ion to at least one first metal nanowire; and further comprising co-producing nitric oxide at a ratio A of moles nitric oxide co-produced per mole of the at least one first reducible metal ion reduced, wherein the ratio A is less than 10% of a ratio B', where B' is the maximum instantaneous ratio of moles nitric oxide co-produced per mole of the at least one first reducible metal ion reduced when reducing the at least one first reducible metal ion in the presence of $Sn^{2+}$ ions.

7. A method comprising:

providing at least one solution comprising at least one first reducible metal ion and at least one second metal or metal ion comprising at least one lanthanide metal or ion of a lanthanide, the at least one second metal or metal ion differing in atomic number from the at least one first reducible metal ion;

reducing the at least one first reducible metal ion to at least one first metal nanowire; and further comprising co-producing nitric oxide at a ratio A of moles nitric oxide co-produced per mole of the at least one first reducible metal ion reduced, wherein the ratio A is less than 10% of a ratio B', where B' is the maximum instantaneous ratio of moles nitric oxide co-produced per mole of the at least one first reducible metal ion reduced when reducing the at least one first reducible metal ion in the presence of $Mn^{2+}$ ions.

8. A method comprising:

providing at least one solution comprising at least one first reducible metal ion and at least one second metal or metal ion comprising at least one lanthanide metal or ion of a lanthanide, the at least one second metal or metal ion differing in atomic number from the at least one first reducible metal ion;

reducing the at least one first reducible metal ion to at least one first metal nanowire; and further comprising co-producing nitric oxide at a ratio A of moles nitric oxide co-produced per mole of the at least one first reducible metal ion reduced, wherein the ratio A is less than 15% of a ratio B', where B' is the maximum instantaneous ratio of moles nitric oxide co-produced per mole of the at least one first reducible metal ion reduced when reducing the at least one first reducible metal ion in the presence of $Cr^{3+}$ ions.

* * * * *